United States Patent
Asiri et al.

(10) Patent No.: US 11,221,309 B2
(45) Date of Patent: *Jan. 11, 2022

(54) MICROCHIP ELECTROCHEMICAL CELL ASSEMBLY

(71) Applicant: King Abdulaziz University, Jeddah (SA)

(72) Inventors: Abdullah Mohamed Asiri, Jeddah (SA); Mohammed Muzibur Rahman, Jeddah (SA)

(73) Assignee: King Abdulaziz University, Jeddah (SA)

( * ) Notice: Subject to any disclaimer, the term of this patent is extended or adjusted under 35 U.S.C. 154(b) by 14 days.

This patent is subject to a terminal disclaimer.

(21) Appl. No.: 16/944,851

(22) Filed: Jul. 31, 2020

(65) Prior Publication Data

US 2020/0363365 A1 Nov. 19, 2020

Related U.S. Application Data

(63) Continuation of application No. 15/342,884, filed on Nov. 3, 2016, now Pat. No. 10,746,686.

(51) Int. Cl.
*G01N 27/30* (2006.01)
*G01N 27/403* (2006.01)

(52) U.S. Cl.
CPC ....... *G01N 27/308* (2013.01); *G01N 27/4035* (2013.01)

(58) Field of Classification Search
CPC ............. G01N 27/4146; G01N 27/308; G01N 27/2035; C01B 31/02; Y10S 977/762; A61B 2562/0285
See application file for complete search history.

(56) References Cited

U.S. PATENT DOCUMENTS 8,778,148 B2 7/2014 Wolf et al.
2003/0207112 A1* 11/2003 Yadav ..................... B29C 70/58
428/402
2005/0133372 A1 6/2005 Zhou et al.
(Continued)

FOREIGN PATENT DOCUMENTS

WO WO 2008/001998 A1 1/2008
WO WO 2015/168435 A1 11/2015

OTHER PUBLICATIONS

Xinman Tu, et al., "Electroanalysis of Bisphenol A at a Multiwalled Carbon Nanotubes-gold Nanoparticles Modified Glassy Carbon Electrode", Electroanalysis, vol. 21, No. 22, Oct. 2009, pp. 2491-2494.

(Continued)

*Primary Examiner* — Gurpreet Kaur
(74) *Attorney, Agent, or Firm* — Oblon, McClelland, Maier & Neustadt, L.L.P.

(57) ABSTRACT

An electrochemical cell that includes a working electrode, which comprises of is made of gold, with gold-coated carbon nanotubes secured thereon via a conductive binder, wherein the electrochemical cell is utilized to detect the presence of bisphenol-A, or to determine a concentration of bisphenol-A in a solution. Various embodiments of the electrochemical cell, a method of producing the electrochemical cell, and a method of using the electrochemical cell for determining a concentration of bisphenol-A in a solution are also provided.

6 Claims, 10 Drawing Sheets

(56) References Cited

U.S. PATENT DOCUMENTS

| | | |
|---|---|---|
| 2011/0068001 A1 | 3/2011 | Affinito et al. |
| 2013/0161066 A1 | 6/2013 | Imae et al. |
| 2013/0209807 A1 | 8/2013 | Chatterjee |
| 2014/0291160 A1 | 10/2014 | Schierbaum et al. |
| 2017/0363563 A1 | 12/2017 | Alvarez et al. |

OTHER PUBLICATIONS

K.V. Ragavan, et al., "Sensors and biosensors for analysis of bisphenol-A", Trends in Analytical Chemistry (TRAC), vol. 52, Dec. 2013, pp. 248-260.

Mohammed M. Rahman, et al., "A gold electrode modified with silver oxide nanoparticle decorated carbon nanotubes for electrochemical sensing of dissolved ammonia", Microchimica Acta, vol. 183, Issue 5, May 2016, pp. 1677-1685 (Abstract only).

Bumsu Kim, et al., "Functionalized Multiwall Carbon Nanotube/Gold Nanoparticle Composites", ACS Publications, Langmuir, vol. 20, No. 19, 2004, pp. 8239-8242 (Abstract only).

George Z. Chen, et al., "Carbon Nanotube and Polypyrrole Composites: Coating and Doping", Advanced Materials, vol. 12, No. 7, 2000, pp. 522-526.

Hong-Jun Chen, et al., "Surface-imprinted chitosan-coated magnetic nanoparticies modified multi-walled carbon nanotubes biosensor for detection of bovine serum albumin", Sensors and Actuators B: Chemical, vol. 163, 2012, pp. 76-83.

\* cited by examiner

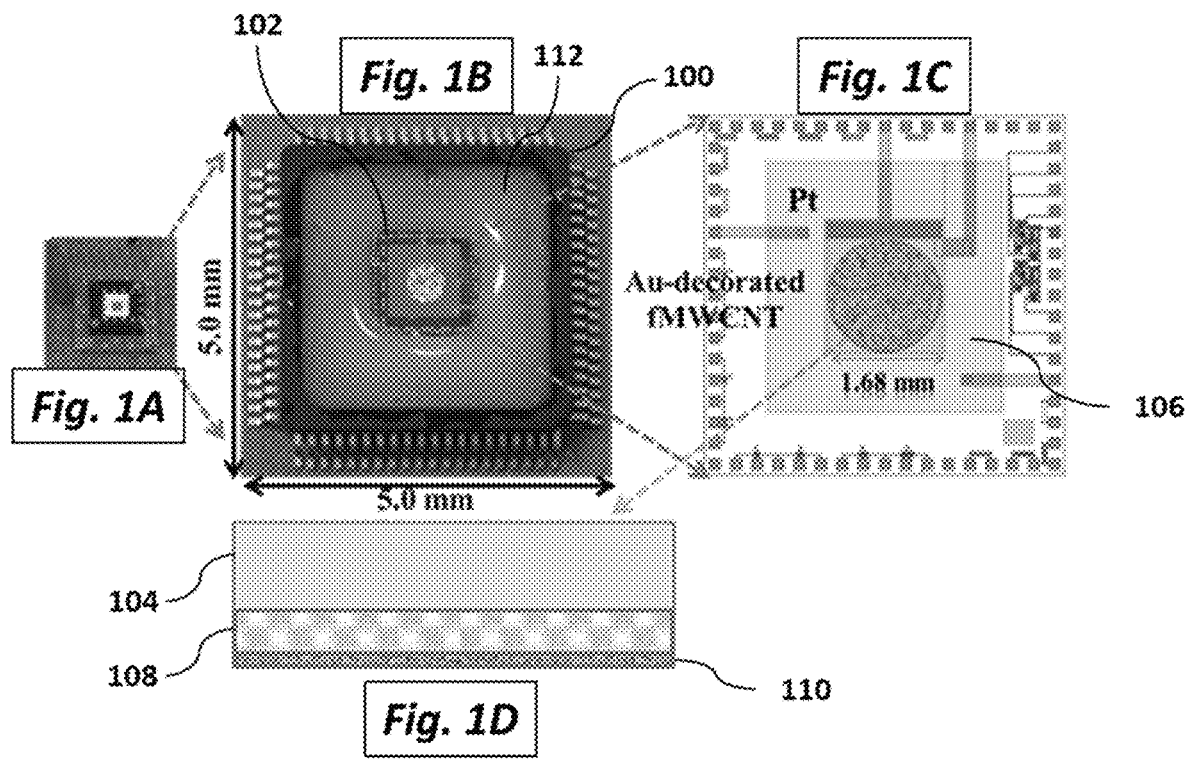

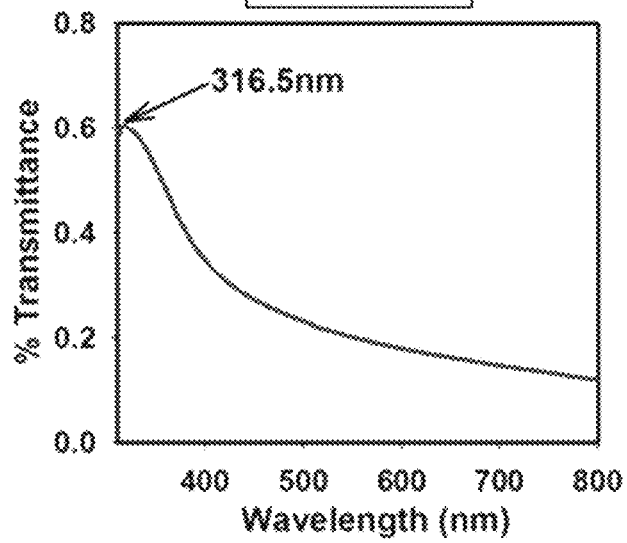
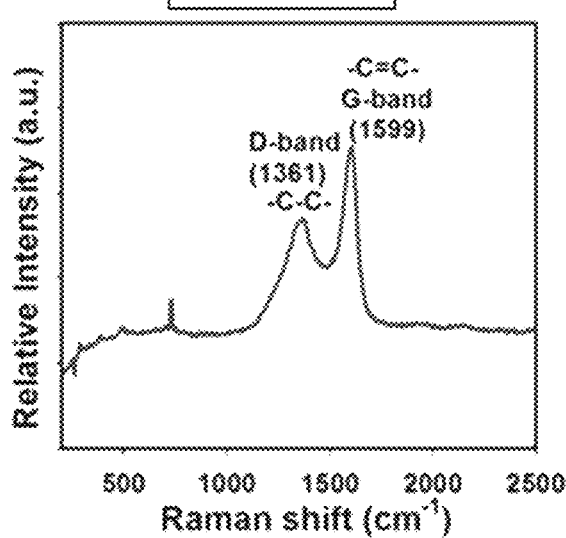
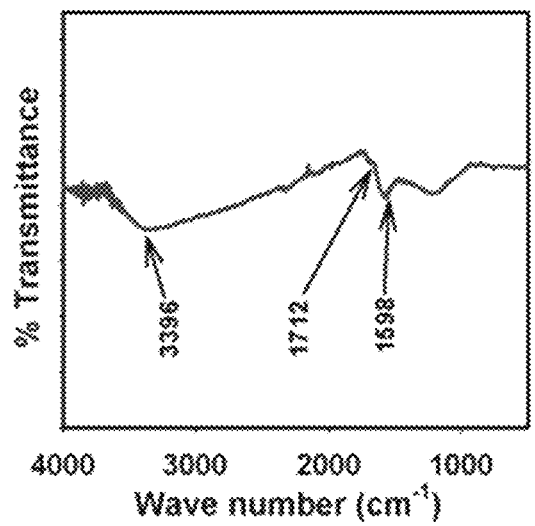
Fig. 2A
Fig. 2B
Fig. 2C

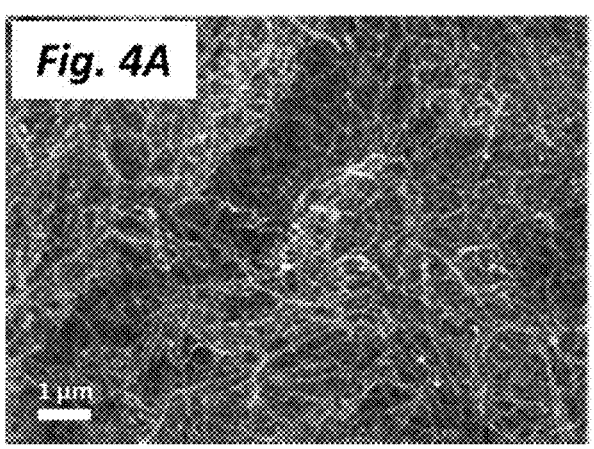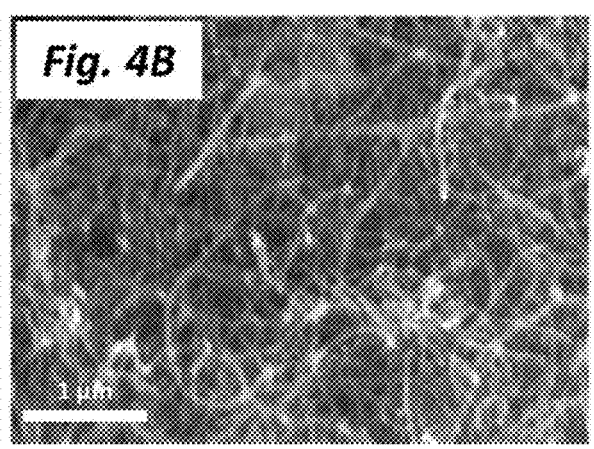

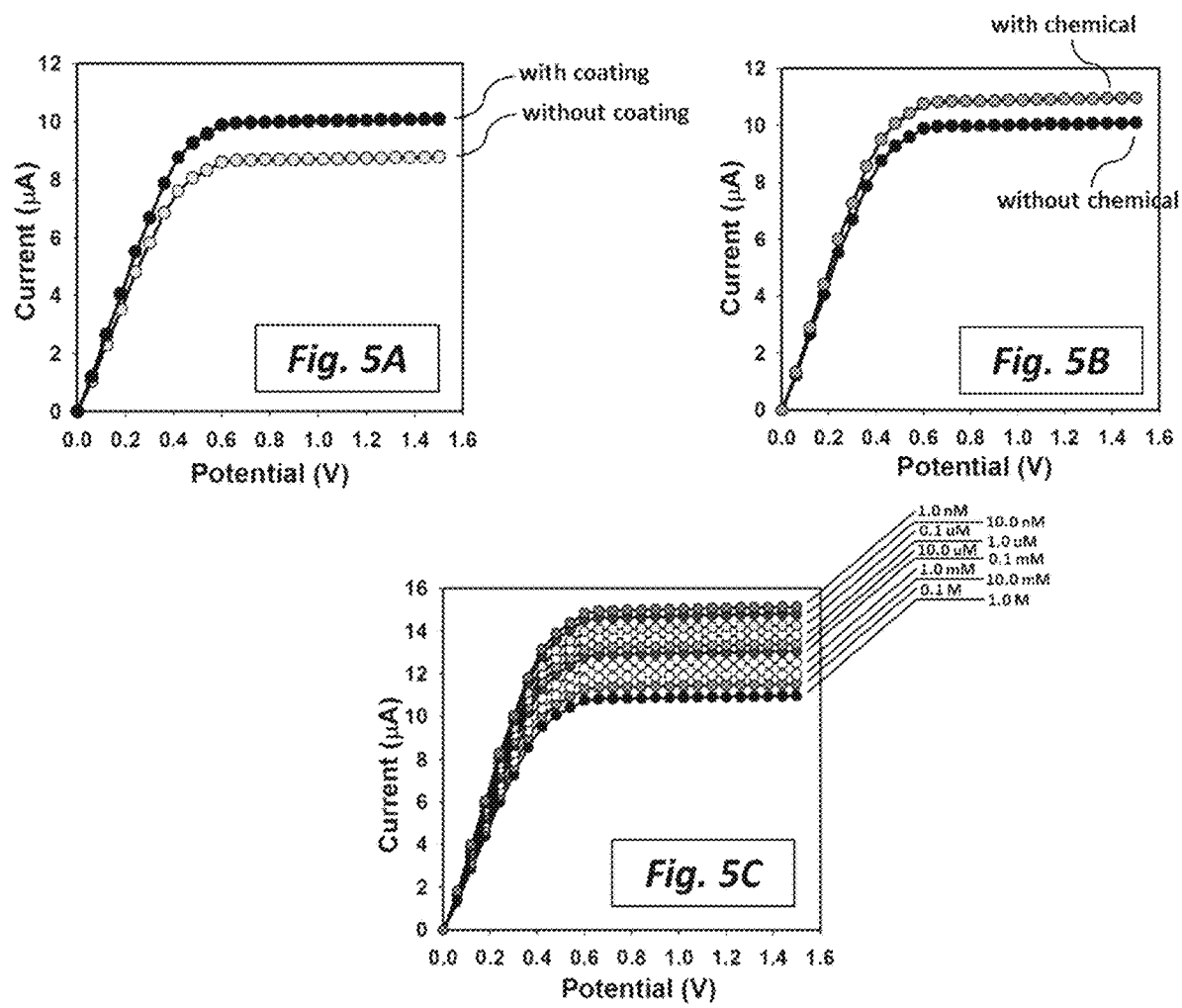

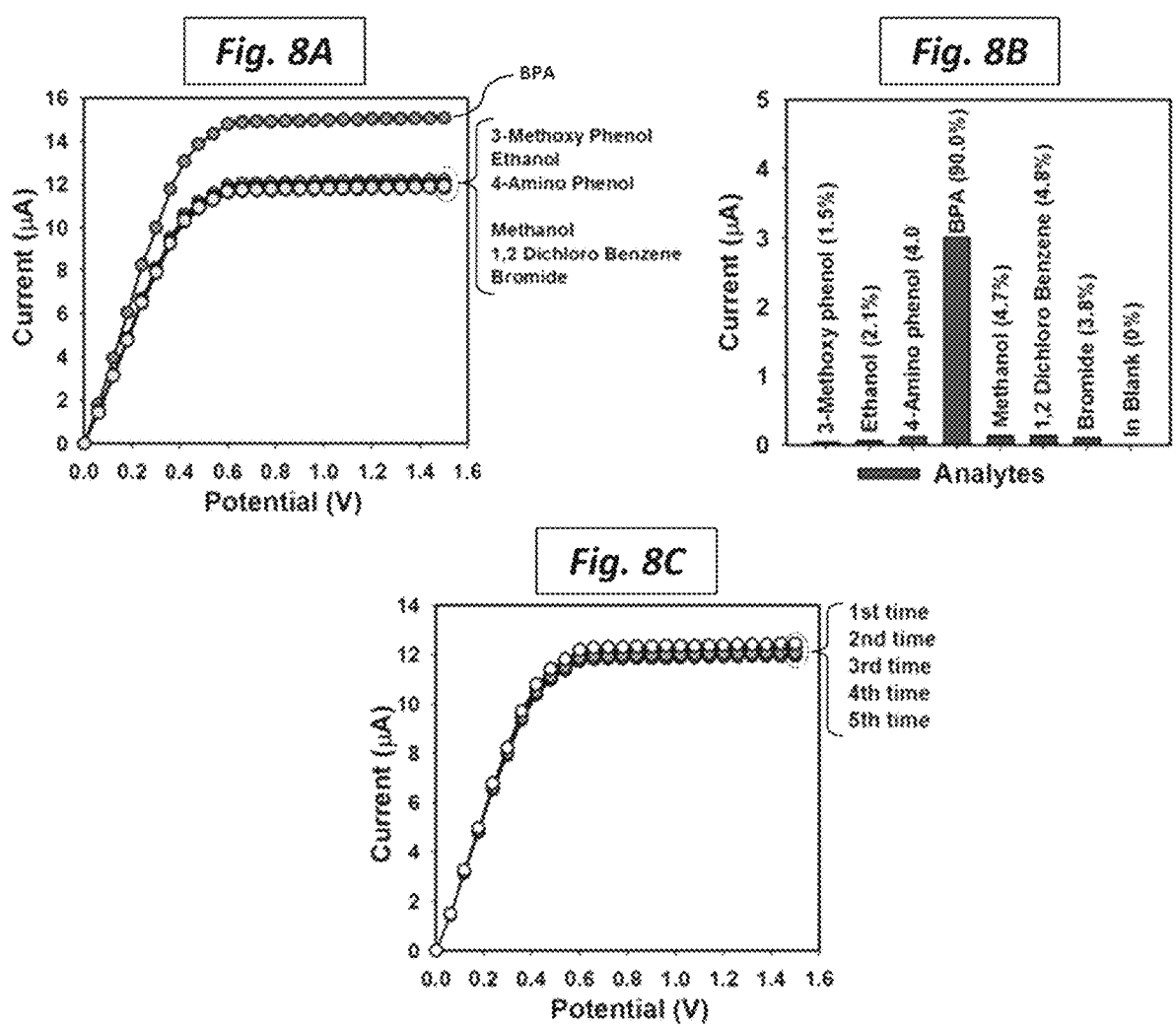

MICROCHIP ELECTROCHEMICAL CELL ASSEMBLY

CROSS-REFERENCE TO RELATED APPLICATION

The present application is a Continuation of Ser. No. 15/342,884, now allowed, having a filing date of Nov. 3, 2016.

BACKGROUND OF THE INVENTION

Technical Field

The present invention relates to an electrochemical cell that includes a working electrode that includes gold, and gold-coated carbon nanotubes secured thereon via a conductive binder. The electrochemical cell is utilized to detect the presence of BPA, and also to determine a BPA concentration of a solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bisphenol-A (2,2-bis(4-hydroxyphenyl)propane, BPA) is a toxic compound which has been extensively utilized in the plastic industry as a monomer for producing epoxy-resins and polycarbonate. BPA is an omnipresent organic compound and it can be unintentionally released into the environment to pollute rivers and ground water resources. Furthermore, BPA can also transfer into food and drinking water from food containers that include polycarbonates and/or epoxy resins, such as infant feeding bottles, tableware, storage containers, food cans, and the like, and therefore, people are regularly exposed to trace amounts of BPA from various sources of drinking water and food items. Research has shown that BPA interferes with hormonal activities by disrupting growth, development, and reproduction of hormones. BPA has also been shown to be a source of cancer. As a result, a rapid and reliable measurement of BPA is important for health protection.

Various techniques have been investigated to measure the concentration of BPA in solutions. Exemplary techniques include i) liquid chromatographs coupled with electrochemical cells, UV/Vis, and/or fluorescence detectors, ii) liquid chromatographs coupled with mass spectrometry, gas chromatography, and iii) gas chromatographs coupled with mass spectrometry. Generally these techniques need expensive and complicated instruments, time-consuming sample preparations, and skilled operators. Other methods, such as fluorimetry, enzyme-linked immunosorbent assay, flow injection chemiluminescence, and electrochemical methods have also been employed for BPA detection. Among these methods, electrochemical techniques are more popular, because of economical approaches of instrumentation, high sensitivity, portability, and simplicity for operators. In order to enhance the electrochemical response of BPA some chemically modified electrodes as well as electrochemical cells have been developed. These electrodes, when disposed in the electrochemical cells, revealed moderate sensitivities, with poor selectivity. Furthermore, most of these electrochemical cells were used to detect the presence of BPA in environmental samples, and not for food sample detection. Therefore, it is necessary to seek a facile, cheap, stable and highly selective method to determine BPA concentrations in the food and pharmaceutical industries.

Functional carbon nanotubes show promise for applications in miniature biological electronic devices and carcinogenic metallic ions determination due to their small dimensions, strength and remarkable physical properties. These nanoparticles have been the subject of numerous investigations in chemical, physical, biological, and material sciences, since their discovery by Iijima in 1991. Depending on their atomic structure, CNTs behave electrically as a metal or as a semiconductor. Functionalized multi-walled carbon nanotubes (fMWCNTs) have also attracted great attention in the past few years. Among the various applications of carbon nanotubes, carbon nanotube (CNT)/metal nanoparticle hybrid-modified electrodes have been developed for uses as fuel-cell catalysts and biosensors. For example, electrocatalysts for a direct methanol fuel cell (DMFC) were prepared by electrodeposition of platinum nanoparticles (PtNPs) on MWCNT/Nafion and single walled carbon nanotube (SWCNT)/Nafion electrodes using Nafion as binder (Wu et al., *J. Power Sources* 2007, 174, 148-158). In addition, a Pt-CNT/glucose biosensor was also developed by incorporation of glucose oxidase (GOx) on a Pt-CNT electrode using a $Pt_{nano}/SiO_2$ composite matrix as a binder (Yang et al., *Biosensors and Bioelectronics* 2006, 21, 1125-1131). However, there is still a need for a simple and low-cost method to prepare an effective electrode with high durability, reactivity and stability and is useful in, for example, electrochemical sensing systems. In addition, carbon nanotubes, when used in conjunction with other elements, have been shown to effectively detect the presence of organic molecules and proteins. The patent WO 2015, 168435 relates to an electrode that includes a buckypaper of functionalized carbon nanotubes (e.g. single-walled or multi-walled carbon nanotubes), and gold nanoparticles dispersed in the buckypaper for sensing biomarkers. In addition, the U.S. Pat. App. No. 2013/0161066 relates to a carbon nanotube-loaded electrode and a method of producing it, wherein the carbon nanotubes are functionalized with metal nanoparticles-encapsulated dendrimers to sense organic molecules.

In view of the forgoing, one objective of the present invention is to provide an electrochemical cell that includes a working electrode, which comprises of or is made of gold, with gold-coated carbon nanotubes secured thereon via a conductive binder. The electrochemical cell is utilized to detect the presence of BPA, and also to determine a BPA concentration of a solution.

BRIEF SUMMARY OF THE INVENTION

According to a first aspect the present disclosure relates to an electrochemical cell, including i) a working electrode that includes gold, ii) gold-coated carbon nanotubes that include a) carboxylic acid functionalized carbon nanotubes, b) gold nanoparticles bound to the carboxylic acid functionalized carbon nanotubes, iii) a conductive binder that binds the gold-coated carbon nanotubes to the working electrode, iv) a counter electrode disposed adjacent to the working electrode having a gap therebetween.

In one embodiment, the working electrode consists of gold. In another embodiment, the working electrode does not include a material selected from the group consisting of a glassy carbon, a glass, a quartz, a glass wafer, a silicon wafer, a melted silica, and a transparent polymer.

In one embodiment, the counter electrode comprises at least one metal selected from the group consisting of platinum, silver, copper, and zinc.

In one embodiment, the conductive binder comprises at least one compound selected from the group consisting of an alkyl acetate, a polyether acetate, a conductive epoxy, a polythiophene, a polythiophene-poly(styrenesulfonate) copolymer, a polyacetylene, a polyaniline, a polypyrrole, and derivatives thereof.

In one embodiment, the carbon nanotubes are multi-walled carbon nanotubes.

In one embodiment, the gold-coated carbon nanotubes are in the form of a buckypaper.

In one embodiment, the gold-coated carbon nanotubes have a specific surface area in the range of 50-500 $m^2/g$.

In one embodiment, a diameter of each of the gold-coated carbon nanotubes is within the range of 5-20 nm.

In one embodiment, an amount of the gold nanoparticles in the gold-coated carbon nanotubes is within the range of 0.5-2.5 vol %.

In one embodiment, the gold-coated carbon nanotubes form a layer on the working electrode with a thickness in the range of 10 to 1000 μm.

In one embodiment, the gold-coated carbon nanotubes form a layer on the working electrode having pores in the size range of 0.5-5 nm.

In one embodiment, the electrochemical cell is disposed on a microchip, wherein the working electrode is circular having a diameter in the range of 1-10 mm, and wherein the counter electrode is disposed circumferentially around the working electrode having a gap therebetween.

According to a second aspect the present disclosure relates to a method of determining a BPA concentration in a BPA-containing solution with the electrochemical cell. The method involves i) contacting the BPA-containing solution with the working electrode and the counter electrode of the electrochemical cell, ii) applying a voltage to the working electrode and the counter electrode to oxidize at least a portion of BPA in the BPA-containing solution to produce an electric current within the electrochemical cell, iii) determining the BPA concentration in the BPA-containing solution based on the electric current.

In one embodiment, the BPA concentration in the BPA-containing solution is within the range of 1.0 nM to 1.0 M.

In one embodiment, the BPA concentration in the BPA-containing solution is determined in a time range of 5-20 seconds after the contacting.

In one embodiment, the BPA-containing solution comprises BPA and one or more of $C_1$-$C_5$ alcohols, $C_1$-$C_5$ alkoxy phenols, amino phenols, aryl halides, and halide ions, and the method has a BPA selectivity of at least 90%.

In one embodiment, the voltage is up to 2.0 V.

According to a third aspect the present disclosure relates to a method of producing the electrochemical cell, involving i) binding the gold-coated carbon nanotubes onto the working electrode with the conductive binder, ii) disposing the counter electrode adjacent to the working electrode having a gap therebetween.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a top-view of a microchip of the present disclosure.

FIG. 1B is a magnified image of the microchip, wherein an electrochemical cell is disposed at the center of the microchip.

FIG. 1C is an illustration of the electrochemical cell of the microchip, wherein a working electrode is disposed at the center and a counter electrode is secured circumferentially around the working electrode.

FIG. 1D represents the working electrode and gold-coated carbon nanotubes adhered thereon via a conductive binder.

FIG. 2A is a UV/Vis spectrum of the gold-coated carbon nanotubes, in transmittance mode.

FIG. 2B is a Raman spectrum of the gold-coated carbon nanotubes.

FIG. 2C is a FTIR spectrum of the gold-coated carbon nanotubes, in transmittance mode.

FIG. 4A is an FESEM micrograph of the gold-coated carbon nanotubes.

FIG. 4B is a magnified FESEM micrograph of the gold-coated carbon nanotubes.

FIG. 5A is an I-V response of the electrochemical cell with and without the gold-coated carbon nanotubes.

FIG. 5B is an I-V response of the electrochemical cell having the gold-coated carbon nanotubes, in the presence (with chemical) and in the absence (without chemical) of a BPA-containing solution.

FIG. 5C is an I-V response of the electrochemical cell having the gold-coated carbon nanotubes, in the presence of a BPA-containing solution having a BPA concentration in the range of 1.0 nM to 1.0 M.

FIG. 8A is an I-V response of the electrochemical cell having the gold-coated carbon nanotubes, in the presence of a BPA-containing solution having BPA and one or more organic molecules selected from the group consisting of $C_1$-$C_5$ alcohols, $C_1$-$C_5$ alkoxy phenols, amino phenols, aryl halides, and halide ions.

FIG. 8B represents a sensitivity of the electrochemical cell to BPA over other organic molecules present in the BPA-containing solution.

FIG. 8C is an I-V response of the electrochemical cell when exposed to a BPA-containing solution at different times.

DETAILED DESCRIPTION OF THE EMBODIMENTS

Figure 1E:
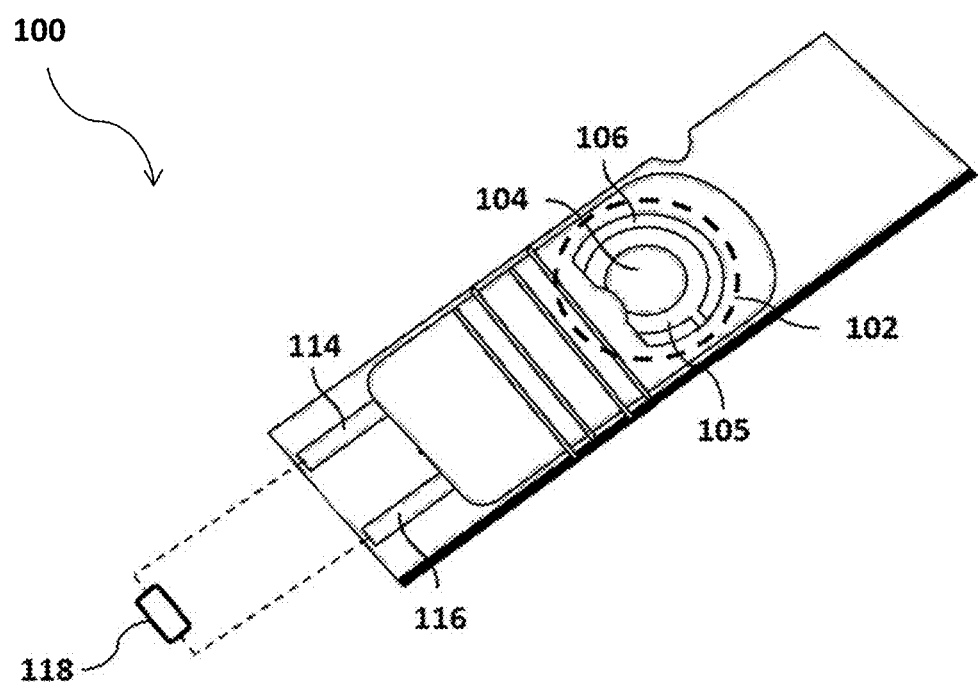
FIG. 1E illustrates a strip form of the microchip.

Referring now to the drawings, wherein like reference numerals designate identical or corresponding parts throughout the several views.

According to a first aspect the present disclosure relates to an electrochemical cell, including a working electrode 104 and a counter electrode 106 disposed adjacent to the working electrode having a gap 105 therebetween.

The electrochemical cell 102 provided herein may be used as an indicative tool to detect and/or determine the concentration of at least one organic molecule selected from the group consisting of bis-phenolic compounds (e.g. bisphenol-A, bisphenol-F, bisphenol-S, bisphenol-C, bisphenol-E, bisphenol-P, bisphenol-Z, etc.), $C_1$-$C_5$ alcohols (e.g. methanol, ethanol, propanol, isobutanol, n-butanol, n-pentanol), $C_1$-$C_5$ alkoxy phenols (e.g. methoxy phenol, ethoxy phenol, etc.), amino phenols, and aryl halides (e.g. dichlorobenzene). The electrochemical cell 102 may also be used to detect and/or determine the concentration of halide ions (e.g. fluoride, chloride, bromide, and iodide). In a preferred embodiment, the electrochemical cell 102 is used as an indicative tool to detect and/or determine the concentration of bisphenol-A (i.e. 2,2-bis(4-hydroxyphenyl)propane, or BPA). The electrochemical cell 102 provided herein may also be used to detect environmental pollutants or toxins.

In one embodiment, the working electrode 104 comprises or is made of gold. The working electrode 104, however, preferably does not include a material selected from the group consisting of a glassy carbon, a silicon wafer, a melted silica, a glass, a quartz, a glass wafer, and a transparent polymer. Exemplary transparent polymers include, but are not limited to polystyrene (PS), polycarbonate (PC), poly methyl methacrylate (PMMA), styrene acrylonitrile (SAN), styrene methyl methacrylate (SMMA), polyethylene terephthalate glycol-modified (PET-G), methyl metacrylate butadiene styrene (MBS), and/or any combination thereof.

The working electrode 104 may also be a gold alloy having at least 50 wt %, preferably at least 60 wt %, or preferably at least 70 wt %, or preferably at least 80 wt %, or preferably at least 90 wt %, or preferably at least 95 wt % of gold, with the weight percent being relative to the total weight of the working electrode. In a preferred embodiment, the working electrode 104 is a gold alloy including gold and titanium, wherein at least 70 wt %, or preferably at least 80 wt %, or preferably at least 90 wt % of the working electrode is gold. In some embodiments, the working electrode 104 may include less than 20 wt %, preferably less than 15 wt %, more preferably less than 10 wt %, even more preferably less than 5 wt % of metal nanoparticles. The metal nanoparticles may be made of metals selected from the group consisting of Au, Ti, Ag, Cu, Pt, Pd, Ru, Re, Fe, and Ni. The term "metal nanoparticles" as used herein, generally refers to particles having an average diameter of less than 100 nm, preferably 10-50 nm, more preferably 20-40 nm, even more preferably about 25 nm. In some embodiments, the metal nanoparticles may be bimetallic composites. The bimetallic composites may include, but are not limited to, Pt—Ru, Pt—Ni, or a combination thereof. The bimetallic composites may have substantially similar shapes and/or substantially similar sizes. Alternatively, the bimetallic composites may have substantially different shapes and/or substantially different sizes. An electrical conductivity of the working electrode 104 may be within the range of $3.0\times10^5$-$7.0\times10^5$ s/cm, preferably $3.0\times10^5$-$6.5\times10^5$ s/cm, more preferably $5.0\times10^5$-$6.5\times10^5$ s/cm.

In one embodiment, the counter electrode 106 comprises at least one metal selected from the group consisting of platinum, silver, copper, palladium, indium, and zinc. In a preferred embodiment, the counter electrode 106 is made of platinum or a platinum alloy. In the case of the platinum alloy, the counter electrode includes at least 50 wt %, preferably at least 60 wt %, or preferably at least 70 wt %, or preferably at least 80 wt %, or preferably at least 90 wt %, or preferably at least 95 wt % of platinum, with the weight percent being relative to the total weight of the counter electrode. The counter electrode 106 may also include less than 20 wt %, preferably less than 15 wt %, more preferably less than 10 wt %, even more preferably less than 5 wt % of metal nanoparticles, as described previously. In one embodiment, an electrical conductivity of the counter electrode may be within the range of $3.0\times10^5$-$7.0\times10^5$ s/cm, preferably $3.0\times10^5$-$6.5\times10^5$ s/cm, more preferably $5.0\times10^5$-$6.5\times10^5$ s/cm.

The working electrode and the counter electrode are disposed adjacent to one another such that the gap 105 between the working electrode and the counter electrode is less than 5 mm, preferably less than 2 mm, more preferably less than 0.5 mm.

The electrodes provided herein may provide an electric signal by oxidizing or reducing an organic molecule selected from the group consisting of bis-phenolic compounds (e.g. bisphenol-A, bisphenol-F, bisphenol-S, bisphenol-C, bisphenol-E, bisphenol-P, bisphenol-Z, etc.), $C_1$-$C_5$ alcohols (e.g. methanol, ethanol, propanol, isobutanol, n-butanol, n-pentanol), $C_1$-$C_5$ alkoxy phenols (e.g. methoxy phenol, ethoxy phenol, etc.), amino phenols, and aryl halides (e.g. dichlorobenzene). In addition, the electrodes provided herein may be solid and free-standing films or rods having a structure that are easier to handle than the electrode films formed by evaporating a dispersion from a surface of glassy carbon.

The electrochemical cell 102 further includes gold-coated carbon nanotubes 110 deposited on a portion of an external surface of the working electrode 104. For example, in one embodiment, at least 70%, preferably at least 80%, more preferably at least 90%, even more preferably at least 95% of the external surface of the working electrode 104 is coated with the gold-coated carbon nanotubes 110. One purpose of having gold-coated carbon nanotubes in the electrochemical cell is to increase an electrical conductivity as well as specific surface area of the working electrode. The gold-coated carbon nanotubes also may provide a prolonged stability to the working electrode.

In a preferred embodiment, the gold-coated carbon nanotubes include multi-walled carbon nanotubes (MWCNT) having a diameter within the range of 5-20 nm, preferably 8-15 nm, more preferably about 10 nm, and an aspect ratio of greater than or equal to about 5, preferably greater than or equal to about 100, more preferably greater than or equal to about 1000. The multi-walled carbon nanotubes may be closed structures having hemispherical caps at each end of respective tubes, or they may have a single open end or both open ends. The multi-walled carbon nanotubes also may include a central hollow portion, which may be filled with amorphous carbonaceous compounds.

In another embodiment, the gold-coated carbon nanotubes include single-walled carbon nanotubes (SWCNT) having a diameter within the range of 0.5-3 nm, preferably 1-2 nm, more preferably about 1.5 nm, and an aspect ratio of greater than or equal to about 50, preferably greater than or equal to about 100, more preferably greater than or equal to about 1000. The single-walled carbon nanotubes may be closed structures having hemispherical caps at each end of respective tubes, or they may have a single open end or both open ends.

The single-walled carbon nanotubes also may include a central hollow portion, which may be filled with amorphous carbonaceous compounds.

The single-walled and multi-walled carbon nanotubes may be synthesized by any method known in the art such as an arc discharge method, a laser ablation method and a chemical vapor deposition (CVD) method.

Other carbonaceous compounds may also be used in addition to or as a replacement for the single-walled or multi-walled carbon nanotubes of the gold-coated carbon nanotubes. Exemplary carbonaceous compounds include, but are not limited to carbon nanofibers, carbon nanorods, carbon nanowhiskers, graphene sheets, fullerenes, and graphite flakes.

In a preferred embodiment, the gold-coated carbon nanotubes 110 are in the form of a buckypaper. A buckypaper may refer to a film-shaped aggregate of carbon nanotubes. Using the gold-coated carbon nanotubes in the form of a buckypaper may result in an enhanced electrical conductivity of the working electrode 104 due to an enhanced electroactive surface area. The buckypaper may have a thickness in the range of 10-1000 µm, preferably 100-1000 µm, more preferably 100-500 µm. In one embodiment, the carbon nanotubes are randomly oriented in the buckypaper. In another embodiment, the carbon nanotubes are substantially aligned in the buckypaper. The carbon nanotubes in the buckypaper may be aligned by methods known in the art, including exposing a magnetic force to a dispersive solution of carbon nanotubes prior to filtering the solution. In one embodiment, the gold-coated carbon nanotubes of the buckypaper are in the form of aggregates having a size range of 0.5-1000 µm, preferably 10-100 µm. The buckypaper, however, preferably does not include an electro-catalytic molecule such as an enzyme or an antibody, and therefore the electrochemical cell that has the buckypaper cannot be used as a biomarker.

In an alternative embodiment, the gold-coated carbon nanotubes 110 may be deposited on the working electrode 104 to form a layer with a thickness in the range of 10-1000 µm, preferably 100-1000 µm, more preferably 100-500 µm.

The gold-coated carbon nanotubes 110 include carboxylic acid functionalized carbon nanotubes, wherein gold nanoparticles are bound to the carboxylic acid functionalized carbon nanotubes.

The method of fabricating the gold-coated carbon nanotubes has been discussed in detail in the third aspect of the present disclosure. In one embodiment, the carboxylic acid functionalized carbon nanotubes are produced by treating the carbon nanotubes in an acid solution. An acid treatment may impart the carbon nanotubes with carboxyl substituents. The acid solution may be one selected from the group consisting of sulfuric acid, nitric acid, or a combination thereof. For example, in one embodiment, carbon nanotubes are contacted with a 3:1 mixture of sulfuric acid and nitric acid for a sufficient time to impart the carbon nanotubes with a desired amount of carboxyl substituents. The carbon nanotubes may then be filtered and washed with deionized water.

In one embodiment, the carboxylic acid functionalized carbon nanotubes are used as precursors for preparing gold-coated carbon nanotubes. Carboxyl functional groups present on the carbon nanotubes may provide strong physical interactions between the carbon nanotubes and gold nanoparticles. Accordingly, the presence of these interactions can reduce the instability of the electrochemical cell due to a release of the gold nanoparticles from the carbon nanotubes. The carboxyl functional groups may be present on sidewalls and/or hemispherical endcaps of the carbon nanotubes. Accordingly, the gold nanoparticles may preferably be bound to the exterior of the carbon nanotubes. However, in some embodiments, the gold nanoparticles may be present inside the carbon nanotubes.

In one embodiment, the gold-coated carbon nanotubes 110 have a specific surface area in the range of 50-500 $m^2/g$, preferably 100-300 $m^2/g$, more preferably about 250 $m^2/g$. In another embodiment, the gold-coated carbon nanotubes 110 have pores in the size range of 0.5-5 nm, preferably 0.5-3 nm, more preferably 1-2.5 nm.

In one embodiment, the gold nanoparticles have an average diameter of less than 100 nm, preferably in the range of 20.0-40.0 nm, more preferably about 25.0 nm. The gold nanoparticles may have substantially similar shapes and/or substantially similar sizes. Alternatively, the gold nanoparticles may have substantially different shapes and/or substantially different sizes.

In one embodiment, an amount of the gold nanoparticles in the gold-coated carbon nanotubes 110 is within the range of 0.5-2.5 vol %, preferably 0.5-1.5 vol %, with the volume percent being relative to the total volume of the gold-coated carbon nanotubes.

The electrochemical cell 102 further includes a conductive binder 108 that immobilizes the gold-coated carbon nanotubes 110 by binding them onto an external surface of the working electrode 104. Accordingly, the conductive binder 108 is sandwiched between the gold-coated carbon nanotubes 110 and the working electrode 104. Although the conductive binder is disposed between the gold-coated carbon nanotubes and the working electrode, the gold-coated carbon nanotubes may still contact the working electrode.

In one embodiment, the conductive binder 108 is in the form of a thin layer having a thickness of 0.5-5 mm, preferably 1-3 mm. In a preferred embodiment, the conductive binder does not require a heat treatment and it can easily be applied onto the external surface of the working electrode 104 to for a thin layer.

In one embodiment, the conductive binder 108 includes at least one compound selected from the group consisting of an alkyl acetate, a polyether acetate, a conductive epoxy, a polythiophene, a polythiophene-poly(styrenesulfonate) copolymer, a polyaniline, a polyacetylene, a polypyrrole, and derivatives thereof. A single conductive polymer may be used alone, or a combination of several conductive polymers may be used as the conductive binder. Suitable polythiophenes include polythiophenes having unsubstituted thiophene rings, or thiophenes rings that are substituted with one or more of substituent alkyl groups, halogen atoms, alkoxy groups, cyano groups, or the like. Poly(3-alkylthiophene), poly(3,4-dialkylthiophene), and poly(3,4-alkenedioxythiophene), such as poly(3,4-ethylenedioxythiophene) (PEDOT), are exemplary polythiophenes. The polythiophene-poly(styrenesufonate) copolymers may also be used as the conductive binder, wherein polythiophene block of the copolymer is one of the compounds as described previously. Example of polythiophene-poly(styrenesulfonate) copolymers include poly(3,4-alkenedioxythiophene)-poly(styrenesulfonate) copolymers such as poly(3,4-ethylenedioxythiophene)-poly(styrenesulfonate). Similarly, the binder may include polypyrrole with unsubstituted pyrrole rings, or polypyrrole rings that are substituted with one or more of substituent alkyl groups, halogen atoms, alkoxy groups, cyano groups, or the like. Poly(3-alkylpyrrole), poly(3,4-dialkylpyrrole), and poly(3,4-alkenedioxypyrrole), or the like are exemplary polypyrroles. Suitable polyanilines include polyanilines having unsubstituted aniline rings, or polyaniline rings that are substituted with one or more of substituent alkyl groups, halogen atoms, alkoxy groups, cyano groups or the like may be used. Poly(n-alkylaniline), poly(arylamine), poly(phenylenediamine), and poly(aminopyrene), or the like are exemplary polyanilines.

In one embodiment, the conductive binder 108 is a composite comprising a polymer and metal particles. The metal particles may be metal nanoparticles (described previously). The metal particles may also be in the form of flakes, powders, rods, etc. for example, as a result of machining, drilling, or sawing a metal. The metal particles may be at least one metal selected from the group consisting of Au, Ag, Cu, Pt, Pd, Ru, Re, Fe, and Ni. The metal particles may have substantially similar shapes and/or substantially similar sizes. Alternatively, the metal particles may have substantially different shapes and/or substantially different sizes. The polymer of the conductive binder 108 may be at least one polymer selected from the group consisting of an epoxy (i.e. the conductive epoxy), a vinyl ester, a nitrocellulose, a polysulfide, a polybutadiene, a polybutadiene-b-acrylic acid, a polybutadiene-b-acrylonitrile, a carboxyl terminated polybutadiene, a polyurethane, a hydroxy terminated polybutadiene, and a polyglycidyl nitrate. In an alternative embodiment, the conductive binder 108 is a composite comprising a polymer and non-metal conductive particles, wherein the non-metal conductive particles may be at least one non-metal selected from the group consisting of carbon nanofibers, graphene sheets, carbon nanotubes, fullerenes, graphite flakes, or metal-substituted polyhedral oligomeric silsesquioxane (POSS), and wherein the polymer is as described. In case, where metal particles are used, an amount of the metal particles in the conductive binder 108 may be within the range of 0.5-5 vol %, preferably 1-3 vol %, more preferably about 2 vol %, with the volume percent being relative to the total volume of the conductive binder. Alternatively, in case, where non-metal conductive particles are used, an amount of the non-metal conductive particles in the conductive binder may be within the range of 0.5-3.5 vol %, preferably 0.5-1.5 vol %, more preferably about 1 vol %, with the volume percent being relative to the total volume of the conductive binder. In some alternative embodiments, if metal particles are used, the amount of the metal particles in the conductive binder 108 may be within the range of 5-50 wt %, preferably 10-30 wt %, more preferably 10-20 wt %. However, if non-metal particles are used, the amount of the non-metal conductive particles in the conductive binder may be within the range of 5-15 wt %, preferably 5-10 wt %, with the weight percent being relative to the total weight of the conductive binder. In another embodiment, the conductive binder includes 1-10 wt %, preferably 2-5 wt %, more preferably about 3 wt % of nafion. An electrical conductivity of the conductive binder 108 may be within the range of 0.5-1000 s/cm, preferably 500-1000 s/cm.

Figure 1F:
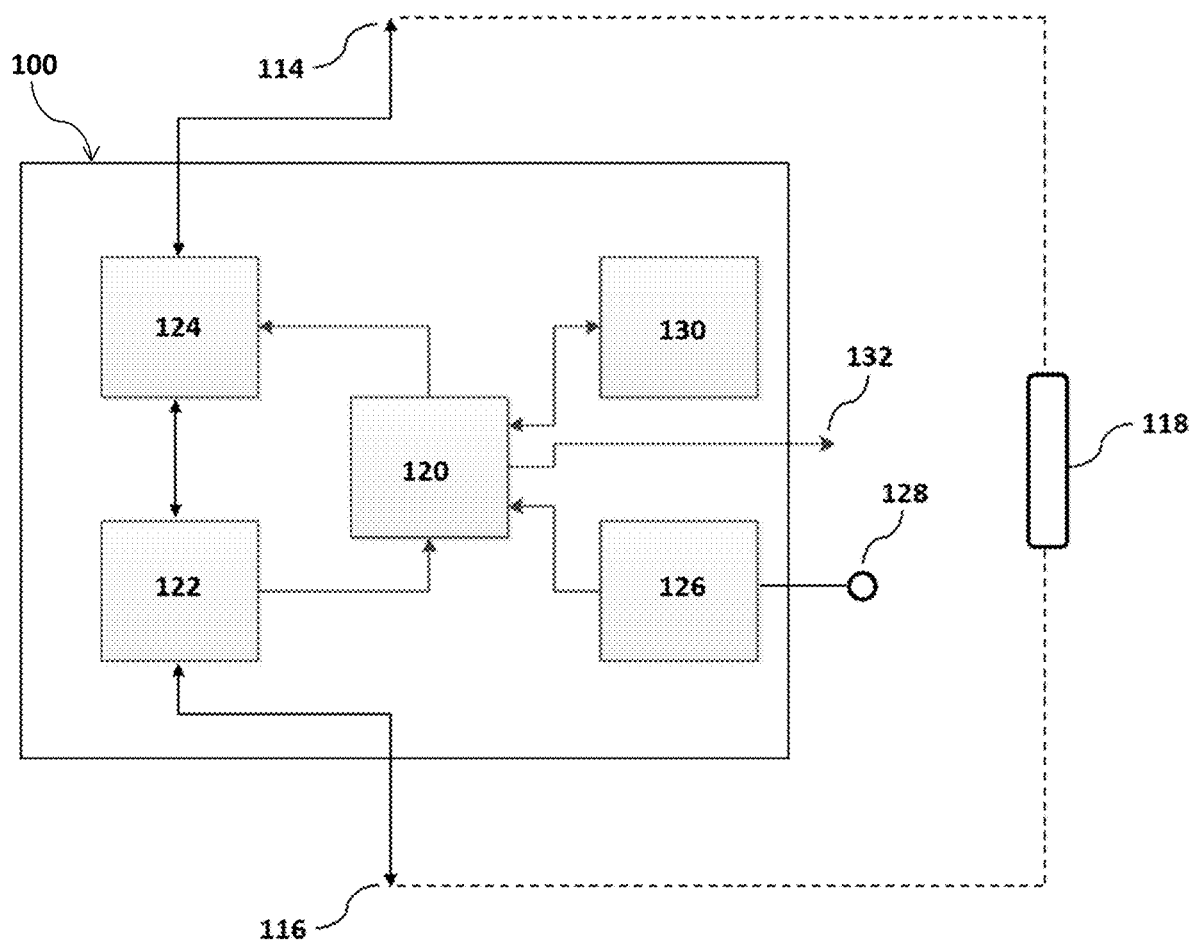
FIG. 1F represents components of the microchip.

Referring to FIG. 1F. In one embodiment, the electrochemical cell 102 is secured on a microchip 100, which includes a voltage input 114 in electrical communication with the working electrode 104, and a voltage output 116 in electrical communication with the counter electrode 106.

A current/voltage sensing circuit 122 is provided for measuring an applied voltage and a produced electric current within the electrochemical cell 102. The current/voltage sensing circuit 122 may exist as an individual, a stand-alone circuit, or may exist as a sub-circuit. In addition, a central processing circuit 120 is in electrical communication with the current/voltage sensing circuit 122.

In one embodiment, a temperature sensor circuit 126 in electrical communication with the central processing circuit 120 is provided for collecting temperature data of a solution being contacted with the electrochemical cell 102, generating a data signal based on the temperature data collected and transmitting the same to the central processing circuit 120. The temperature sensor circuit 126 includes one or more temperature sensing elements 128 in electrical communication therewith. The sensing element(s) may be positioned on the microchip 100, positioned proximal to the microchip 100, and/or may be positioned at a location that is remote from the microchip 100, so as to allow for temperature measurements at multiple locations within and outside the electrochemical cell. The sensing element(s) may be selected from the group consisting of resistance temperature detectors (RTD's), thermistors, thermocouples, diodes, and mixtures thereof. In a preferred embodiment, the sensing element is a platinum RTD. Sensing elements and supporting circuitry are known in the art and are commercially available. In one embodiment, the temperature sensor circuit 126 is capable of measuring temperatures within the range of −50° C. to 250° C., preferably −50° C. to 150° C.

In one embodiment, the microchip 100 further includes a transmitter/receiver circuit 130 in electrical communication with the central processing circuit 120 for wirelessly transmitting signals to a processing device such as a computer, or receiving signals from remotely located electronic devices such as a sensors or programmable logic controllers. In response to signals received by the current/voltage sensing circuit 122, temperature sensor circuit 126, and/or the transmitter/receiver circuit 130 (if provided), the central processing circuit 120 transmits an output I-V signal 132 to a monitor device for displaying an I-V output of the electrochemical cell. In one embodiment, the transmitter/receiver circuit 130 wirelessly transmits the output I-V signal 132 to a monitor device for displaying the I-V output of the electrochemical cell.

In one embodiment, the electrochemical cell 102 is secured onto the microchip 100, wherein at least a portion of the microchip 100, which is not configured to be in a contact with a target solution, is covered with an encapsulating material 112 which is substantially chemically inert with respect to the solution being contacted with the electrochemical cell. Suitable encapsulating materials 112 include, but are not limited to polytetrafluoroethylenes, epoxies, silicones, polyurethanes, polyimides, silicone-polyimides, parylenes, polycyclicolefins, silicon-carbons, and benzocyclobutenes.

In one embodiment, a switch 124 is provided in the microchip 100, which in electrical communication with the central processing circuit 120. Accordingly, the central processing circuit 120 is preprogrammed to actuate the switch 124 in response to signals from the current/voltage, temperature, and/or transmitter/receiver circuits 130, respectively. In one embodiment, the central processing circuit 120 is preprogrammed to actuate the switch 124 in response to receiving one or more of the following signals: (1) a signal from the current/voltage sensing circuit, indicating the applied voltage to the electrochemical cell falls outside a predetermined range; and (2) a signal from the temperature sensor circuit 126, indicating the temperature detected by one or more temperature sensing elements 128 falls outside a predetermined range. As it is understood by those with ordinary skill in the art, the acceptable operational ranges (i.e. the predetermined ranges) for a given electrochemical cell is governed by factors such as components used to construct the electrochemical cell, the architecture of the electrochemical cell, and the application for which the electrochemical cell is employed.

In a preferred embodiment, the electrochemical cell 102 is secured on a microchip 100, wherein the working electrode 104 is circular having a diameter in the range of 1-10 mm, preferably 1-5 mm, more preferably about 1.5-2 mm, and wherein the counter electrode 106 is disposed circumferentially around the working electrode having a gap therebetween (as shown in FIGS. 1A, 1B, and 1C).

In one embodiment, the microchip 100 may be in the form of a strip, wherein the electrochemical cell 102 is disposed thereon (as shown in FIG. 1E).

In a preferred embodiment, the microchip 100 is employed for detecting bisphenol-A. Furthermore, the microchip may be utilized for detecting organic pesticides such as organophosphate.

According to a second aspect the present disclosure relates to a method of determining a BPA concentration in a BPA-containing solution with the electrochemical cell 102. The method in accordance with the second aspect involves contacting the BPA-containing solution with the working electrode 104 and the counter electrode 106 of the electrochemical cell 102.

Contacting the BPA-containing solution with the working electrode and the counter electrode of the electrochemical cell may involve submersing, or partially submersing the electrochemical cell within the BPA-containing solution. In the embodiments where the electrochemical cell is disposed on a microchip, the microchip may be shaped and sized according to the size of the BPA-containing solution. For example, the microchip can be as small as the size of a body vein for in-vivo BPA measurement of blood in a human body. Accordingly, the microchip can be implanted or embedded, or the microchip may be associated with hooks, barbs, or other features known in the art that permit the microchip to be implanted or embedded. In addition, contacting may also involve disposing the BPA-containing solution with an amount sufficient to generate a desirable signal onto the electrochemical cell by any means known in the art such as spraying, etc.

The BPA-containing solution may refer to any solution that contains BPA. Exemplary BPA-containing solutions may include tap water, wastewater, bottled water, bottled sodas, liquid in canned foods, canned juices, and the like. In a preferred embodiment, the BPA concentration in the BPA-containing solution is within the range of 1.0 nM to 1.0 M, preferably 1.0 nM to 1.0 mM, although the electrochemical cell may determine the BPA concentration in the BPA-containing solution if the BPA concentration falls outside of these preferable ranges. In another embodiment, the electrochemical cell determines the presence of bisphenol-A in a solution. In one embodiment, the BPA-containing solution comprises BPA and one or more of $C_1$-$C_5$ alcohols (e.g. methanol, ethanol, propanol, isobutanol, n-butanol, n-pentanol), $C_1$-$C_5$ alkoxy phenols (e.g. methoxy phenol, ethoxy phenol, etc.), amino phenols, and halides (e.g. dichlorobenzene), halide ions (e.g. fluoride, chloride, bromide, and iodide), and the like. Accordingly, the electrochemical cell 102 has a BPA selectivity of at least 80%, preferably at least 85%, more preferably at least 90%. The term "BPA selectivity" of the electrochemical cell refers to a molar ratio (in percentile) of BPA over other organic molecules that are oxidized on the working electrode 104. For example, if the BPA selectivity of the electrochemical cell is 90%, that means 90 mol % of all molecules that are oxidized on the working electrode is BPA. The BPA selectivity of the electrochemical cell may be related to an oxidation of BPA on a surface of the working electrode. Further, it may be related to the kinetics of oxidation. For example, at a specified voltage, BPA may be more readily adsorbed onto the working electrode than other organic molecules.

The method in accordance with the second aspect further involves applying a voltage to the working electrode 104 and the counter electrode 106 of the electrochemical cell 102 to oxidize at least a portion of BPA in the BPA-containing solution to produce an electric current within the electrochemical cell.

Applying the voltage may involve connecting a positive side of a power source 118 to the voltage input 114 and a negative side of the power source 118 to the voltage output 116. In a preferred embodiment, the power source 118 provides a DC current and the voltage is in the range of 0.0 to 2.0 V, preferably 0.0 to 1.5 V.

The method in accordance with the second aspect further involves determining the BPA concentration in the BPA-containing solution based on the electric current.

As used herein, the term "determining" refers to a quantitative measurement that indicates the BPA concentration in the BPA-containing solution, for example, via a calibration curve that relates the electric current to a BPA concentration. The calibration curve may relate to several characteristics of the electrochemical cell, for example, the conductivity of the working electrode, the conductive binder, and the counter electrode, as well as the amount of the gold nanoparticles within the gold-coated carbon nanotubes, the thickness of the layer of the gold-coated carbon nanotubes, the type of the carbon nanotubes (e.g. SWCNT or MWCNT), and the like. The term "determining" may also refer to a qualitative measurement to determine the presence of BPA within a solution.

In one embodiment, the BPA concentration in the BPA-containing solution is determined in a time range of 5-20 seconds, preferably 5-15 seconds, more preferably about 10 seconds, after contacting the BPA-containing solution with the working electrode and the counter electrode.

In one embodiment, the electrochemical cell 102 has a sensitivity within the range of 2.00 to 10.00 $\mu A \cdot cm^{-2} \cdot mM^{-1}$, more preferably 5.70 $\mu A \cdot cm^{-2} \cdot mM^{-1}$, with respect to the BPA concentration. The sensitivity of the electrochemical cell refers to an indication of how much electric current is produced when the BPA concentration changes from a lower bound to an upper bound. For example, if the BPA concentration varies from 1.0 nM to 1.0 mM, an electric current of about 2.00 to 10.00 $\mu A$, more preferably about 5.70 $\mu A$ may be generated per 1.0 $cm^2$ of the electrochemical cell.

According to a third aspect the present disclosure relates to a method of producing the electrochemical cell 102.

In one embodiment, the method in accordance with the third aspect involves fabricating the gold-coated carbon nanotubes 110. Accordingly, the carbon nanotubes are first treated in an acid solution (e.g. sulfuric acid and/or nitric acid) to form a dispersion solution, wherein the carbon nanotubes are dispersed within the acid solution. The carbon nanotubes may be functionalized with carboxylic acid, wherein the weight percent of functionalized carboxylic acid of each carbon nanotube is in the range of 0.01-10 wt %, preferably 0.5-5 wt %, more preferably 1-5 wt %. The carbon nanotubes may also be dispersed with a solvent that does not substantially adversely impact one or more desirable features of the carbon nanotubes and the working electrode. For example, the carbon nanotubes may be dispersed with dimethylformamide (DMF), deionized water, or a combination thereof. The carbon nanotubes may be dispersed via stirring, sonication, agitation, or a combination thereof. In one embodiment, the dispersion solution is subjected to a magnetic force to at least substantially align the carbon nanotubes prior to filtering the carbon nanotubes.

Next, the dispersion solution is diluted in water (preferably a deionized water). In a preferred embodiment, a surfactant is also added to the dispersion solution to increase a solubility of the carbon nanotubes. The surfactant may be an anion surfactant such as SDS (sodium dodecyl sulfate), LDS (lithium dodecyl sulfate), SDBS (sodium dodecylbenzenesulfonate), SDSA (sodium dodecylsulfonate), and the like, a cation surfactant such as DTAB (dodecyltrimethylammonium bromide), CTAB (cetyltrimethylammonium bromide), and the like, or a non-polar surfactant such as PVP (Brij-series, Tween-series, Triton X-series), poly(vinylpyrrolidone), polyethylene oxide-polybutylene oxide-polyethylene oxide triblock copolymer, polyethylene oxide-polyphenylene oxide-polyethylene oxide triblock copolymer, and the like.

After that, the dispersion solution may be sonicated until the color turns into black, and then filtered by any means known in the art to get carboxylic acid functionalized carbon nanotubes. Filtering the dispersion solution may be achieved with a polycarbonate membrane. The filtering may be assisted by pressure or vacuum. After filtering, the carboxylic acid functionalized carbon nanotubes may be washed one or more times with deionized water and air dried. Alternatively, carboxylic acid functionalized carbon nanotubes can be purchased and used from commercial sources such as Sigma Aldrich.

The carboxylic acid functionalized carbon nanotubes are immersed in a gold nanoparticle solution and then sonicated, preferably ultra-sonicated to form the gold-coated carbon nanotubes 110. The gold nanoparticle solution includes a gold precursor and one or more of water (preferably distilled water), an alcohol, and a co-solvent. Accordingly, the co-solvent is one organic compound selected from the group consisting of n-methyl-2-pyrrolidone (NMP), dimethyl acetamide (DMAc), dimethylformamide (DMF), cyclohexanone, ethylalcohol, and chlorobenzene, whereas the alcohol is selected from the group consisting of ethanol, methanol, and ethylene glycol. Exemplary gold precursors include, but are not limited to $HAuCl_4$, $NaAuCl_4$, $AuCl_3$, $NaAuBr_4$, $KAuCl_4$, and hydrates or solvates thereof. In one embodiment, a platinum precursor may be utilized instead of the gold precursor. Exemplary platinum precursors include, but are not limited to $Na_2PtCl_6$, $Na_2PtCl_4$, $H_2PtCl_4$, $H_2PtCl_6$, and hydrates or solvates thereof. In another embodiment, a metal precursor may be used instead of the gold precursor. The metal precursor may refer to a precursor material that includes a metal having a potential of more than +0.5 V, an oxidation state greater than zero, and capable of being reduced to form a metal atom (e.g. $Ag^+$, $Pd^{2+}$, $Cu^{2+}$, $Co^{2+}$, $Cr^{2+}$, $Cr^{3+}$, $Ni^{2+}$). Additionally, a reducing agent known in the art may also be used in the gold nanoparticle solution. Examples of the reducing agent includes but not limited to trisodium citrate, sodium borohydride ($NaBH_4$), citric acid, and lithium aluminum hydride ($LiAlH_4$). Preferably, the pH of the gold nanoparticle solution (or alternatively the Pt or metal nanoparticle solutions) is adjusted to a pH range from 2 to 7, more preferably at about 4. Also, a concentration of the alcohol in the gold nanoparticle solution is in the range of 10-70 vol %, preferably 30-50 vol %, and a concentration of the gold precursor in the gold nanoparticle solution is in the range of 0.001 µM-100 mM, preferably 0.01 µM-50 mM.

The gold-coated carbon nanotubes are filtered by any means known in the art, washed one or more times with deionized water, and air dried.

The method in accordance with the third aspect further involves binding the gold-coated carbon nanotubes 110 onto the working electrode 104 with the conductive binder 108 (as described). Accordingly, a thin layer of the conductive binder 108 with a thickness of 0.5-5 mm, preferably 1-3 mm, more preferably about 1 mm is disposed onto the working electrode, and the gold-coated carbon nanotubes may then be sprinkled onto the conductive binder, followed by air drying the conductive binder. The term "sprinkling" may refer to a way of securing the gold-coated carbon nanotubes or the buckypaper on to the working electrode (e.g. using a robot), wherein the electrochemical cell is disposed onto a microchip.

Binding the gold-coated carbon nanotubes onto the working electrode may be performed via a spraying method such as atomizing (or wet atomizing), or gas dynamic cold spraying. The gold-coated carbon nanotubes may also be bound to the working electrode via stamping the working electrode including the conductive binder into the gold-coated carbon nanotubes.

In another embodiment, the gold-coated carbon nanotubes are in the form of the buckypaper (as described), and the buckypaper is secured onto the conductive binder.

In another embodiment, the gold nanoparticles are pre-mixed with a polymeric binder to form a gold nanoparticle paste. The polymeric binder may be at least one selected from the group consisting of an epoxy (i.e. the conductive epoxy), a vinyl ester, a nitrocellulose, a polysulfide, a polybutadiene, a polybutadiene-b-acrylic acid, a polybutadiene-b-acrylonitrile, a carboxyl terminated polybutadiene, a polyurethane, a hydroxy terminated polybutadiene, and a polyglycidyl nitrate. The gold nanoparticle paste may further be adhered onto the working electrode, without having the conductive binder and the gold-coated carbon nanotubes bound thereon, although it is preferred to bind the gold-coated carbon nanotubes on to the gold nanoparticle paste.

The method in accordance with the third aspect further involves disposing the counter electrode adjacent to the working electrode having a gap therebetween. The gap may have a rounded shape or a straight shape, with a 1-10 mm, preferably a 1-5 mm, more preferably a 3-5 mm distance apart.

In some embodiments, the counter electrode is disposed adjacent to the working electrode in a microchip, which is fabricated via photolithography. Accordingly, a silicon wafer, which is preferably washed with an alcoholic solvent (e.g. isopropyl alcohol), is annealed in nitrogen and aluminium is sputtered thereon, followed by a photolithography process on the sputtered aluminium. Next, a silicon nitride layer is deposited via chemical vapor deposition, and then pad surfaces of the working and the counter electrode are etched via an etching solution (e.g. hydrochloric acid, hydrofluoric acid, etc.), or via plasma etching. After that, platinum is sputtered on the silicon nitride layer, and is further patterned via photolithography to form the counter electrode on the microchip. A similar process is performed on a deposited gold on the silicon nitride layer to form the working electrode on the microchip. In a preferred embodiment, a binding layer (preferably titanium), is disposed on the pad surfaces of each of the working electrode and the counter electrode to increase a bonding strength between each of the working electrode and the counter electrode to the silicon nitride layer. The binding layer may be disposed via photolithography. Accordingly, the counter electrode includes the silicon nitride layer, a titanium layer, and a platinum layer, whereas the working electrode, which is preferably circular, includes the silicon nitride layer, a titanium layer, and a gold layer, such that the working electrode is not in an electrical contact with the counter electrode. An encapsulating material (as described earlier)

may be utilized on a periphery of the microchip to prevent a leakage of the BPA-containing solution (or any test solution).

The examples below are intended to further illustrate protocols for the electrochemical cell and the method of using thereof for detecting BPA, and are not intended to limit the scope of the claims.

EXAMPLE 1

Preparation of Gold Nanoparticles

Analytical grade of bisphenol-A, ethyl acetate, disodium phosphate ($Na_2HPO_4$), butyl carbitol acetate, monosodium phosphate ($NaH_2PO_4$), and other chemicals was used and purchased from Sigma-Aldrich. 0.1 M phosphate buffer phase (PBP) at pH 7.0 is prepared by mixing of equimolar concentration of 0.2 M $Na_2HPO_4$ and 0.2 M $NaH_2PO_4$ solution in 100.0 mL deionized water at room conditions. Stock solution of BPA (1.0M) was made using ultra-pure water from the purchased BPA chemical. As received BPA is used to make various concentrations (0.1 nM to 1.0 M) in DI water and used as a target analyte. 10.0 ml of 0.1 M PBS is kept constant during whole measurements. Brunauer-Emmett-Teller (BET) measurements were investigated on autosorb nitrogen gas sorption system (Quantachrome Instruments) using nitrogen as the adsorbate. Au-decorated fMWCNT materials were degassed for 12.0 hour at 200.0° C. prior to measurement. The nitrogen sorption curve was taken as 60 pts adsorption/60 pts desorption (Equal timeout: 240/240 ads/des), with the BET surface area calculated using a 3 point BET analysis. Fourier transform infrared spectra were recorded for Au-decorated fMWCNT with a spectrophotometer in the mid-IR range, which was obtained from Bruker. Morphology of Au-decorated fMWCNT was evaluated by FESEM instrument (FESEM; JSM-7600F, Japan). Energy dispersive X-ray analysis (XEDS) was investigated for Au-decorated fMWCNT using FESEM-coupled XEDS from JEOL, Japan. The X-ray photoelectron spectroscopy (XPS) measurements were executed on a Thermo Scientific K-Alpha KA1066 spectrometer for Au-decorated fMWCNT. A monochromatic AlKα X-ray radiation source was used as excitation sources, where beam-spot size was kept in 300.0 µm. The spectra were recorded in the fixed analyzer transmission mode, where pass energy was kept at 200.0 eV. The scanning of the X-ray spectra was performed at pressures less $10^{-8}$ Torr. X-ray diffractometer equipped with Cu-K$\alpha_1$ radiation ($\lambda$=1.5406 nm) by a generator voltage (~40.0 kV) and current (~35.0 mA) applied for this measurement. The Au-decorated fMWCNT was investigated with UV/visible spectroscopy [Lamda-950, Perkin Elmer, and Germany].

Gold nanoparticles were prepared in solution method under the control stirring at room conditions. Initially, 20.0 ml aqueous solution containing 0.025 µM $HAuCl_4$ and 0.025 µM trisodium citrate was dissolved in a conical flask containing deionized water and then put the mixture onto control magnetic stirring at room condition for 5 min. Then, ice-cold 0.1 M freshly prepared $NaBH_4$ solution (0.6 ml) was slowly added to the first mixture under control stirring. During addition, the solution twirled light pink, indicating the gold nanoparticle formation. In UV/vis spectra, an absorption band was found at approximately 532 nm in UV-visible spectra which confirmed that the gold nanoparticles were homogeneously formed into the aqueous system.

EXAMPLE 2

Preparation and Purification of Au-Decorated fMWCNT

Carbon nanotubes are high quality and quite pure, although some nanoparticles still exist in the purchased material as a by-product. fMWCNTs are formed either as isolated units or as nanotubes arranged in bundles; no attempt was made to separate the different configurations. The purification of common carbon nanotubes is of great importance since most carbon nanotube applications require materials of high quality. Acid treatment is a common way for purification of carbon nanotubes and has constituted the first step in many different purification schemes. Nitric acid treatment is usually employed to remove metal catalysts, together with some of the amorphous carbon, but it can also oxidize carbon atoms at the ends. Sonicating carbon nanotubes in nitric acid opens the ends of the carbon nanotubes and thereby introduces carboxylic acid groups at the ends or at defect sites of carbon nanotubes. The preparation of MWCNTs functionalized with carboxylic acid groups was carried out as follows; first, soak the MWCNTs in 5.0 M nitric acid, ultrasonically disperse them for 6.0 min. Second, dilute with a large amount of water and add a little Triton X-100 surfactant to increase solubility, sonicate it to be a black solution. Third, filter the black solution with 0.2 µm diameter film and collect the nanotubes. Repeat the second and the third steps. The evidence for the formation of functional carboxyl group (peak at 1712 $cm^{-1}$) on the fMWCNT is exhibited by FTIR spectroscopy. Then the air-dried filtrate functional MWCNT (0.5 wt %) again dispersed in 10.0 ml gold nanoparticles solution (0.1 mM) for 2 hours under ultra-sonication. The Au-nanoparticles decorated fMWCNT mixture was filter first and dried for 3 hours in the air and then investigated for the total characterization. The final product was also used for the chemical sensor development using tiny microchips with conducting coating binders by reliable I-V method.

EXAMPLE 3

Construction of Tiny µ-Chips Using Photolithography Method

Electrochemical microchips were fabricated by conventional photolithographic technique, where electrodes and passivation layers were developed on silicon wafer followed by dicing and packaging. Nitrogen-doped silicon wafers were prepared and overflowed by extra-pure water. In this step, all contaminations on the surface and native $SiO_2$ layer are removed perfectly. At first, the wet oxidation was employed and then dry oxidation was executed, where wafers annealed in the nitrogen environment. Aluminium was sputtered with aluminum-1% Si target. Then the photolitograph processes were applied. Resist coating, baking, exposure, and development were employed by Kanto chemicals, and then it was rinsed thoroughly by ionic water. Aluminium was etched by etching solution and resistance layer was removed perfectly by plasma etching instrument. Then silicon wafers were cleaned by acetone, methanol, and finally by plasma simultaneously. Silicon nitride (SiN) layer was deposited by chemical vapour deposition and then pad electrode surfaces were etched by reactive ion etching. Finally residual resist layer was removed by plasma etching. After photolithographic process, platinum was sputtered by SP150-HTS. Then it was patterned by lift-off method, in which wafers was immersed into the remover, and then washed with isopropyl alcohol. Photolithographic process was again investigated, where titanium sputtered as a binding layer, and then gold was evaporated by deposition method. Finally, gold layer was patterned by lift-off method. Parylene passivation layer was formed for the protection of the microchip from water. Photolithographic process was performed again for pad protection. Then parylene-dimer was evaporated by deposition apparatus. Photolithography process was done again for patterning. Parylene layer was patterned by etching. Finally, un-necessary resists were removed by acetone and then wafer is cleaned by isopropyl alcohol (IPA). Resist was coated on a whole surface of the silicon wafer for protection during dicing process was executed. Silicon wafer was diced into pieces by dicing apparatus and stored into the desiccators, when not in use. Resist on microchip surface was removed by acetone and cleaned with IPA. The opposite side of the chip was roughed by a sandpaper sheet for better adhesion and electrical stability. The microchip is bonded with die and packaged by silver paste. It was dried in a drying oven. Pads on chip were connected to the package through gold wire with bonding machine. Finally, silicon-based adhesive was put on the periphery of the chip to protect pads and gold wire from sample solution. Adhesive was dried for 24 hours at room temperature. The semiconductor smart microchips were fabricated on silicon wafer. Aluminium was sputtered to fabricate as wiring and bonding pads. Pt—Ti—TiN was sputtered on thermal oxide of silicon and patterned by photolithography to fabricate counter electrode (CE). Ti—TiN layers were used for strong adhesion. Au—Ti were sputtered and lithographed, which made circular working electrode (WE) with a diameter of 1.68 mm in the centre of the microchip.

After electrodes fabrication, the parylene layer was fabricated by evaporation method as a passivation layer. The wafer was diced to 5.0 mm square microchips. This microchip was bonded to a package by silver paste. Aluminium pads were connected to the package by gold wire. Finally, adhesive (Araldite, Hantsman, Japan) was put on the periphery of the chip, which prevents target solution from contacting pads.

EXAMPLE 4

Optical Analysis

The optical absorption spectra of Au-decorated MWCNT are accomplished by UV-vis. spectrophotometer in the visible range (400.0~800.0 nm). From the absorption spectrum, it has been found the maximum wavelength for Au-decorated MWCNT is about 316.5 nm, which is presented in FIG. 2A. Bang-gap energy ($E_{bg}$) is calculated on the basis of the maximum absorption band of Au-decorated MWCNT and found to be ~3.9241 eV, according to the following equation (Eq. 1):

$$E_{bg} = \frac{1240}{\lambda} \text{ (eV)} \quad \text{(Eq. 1)}$$

where $E_{bg}$ is the band-gap energy and $\lambda_{max}$ is the wavelength (~316.5 nm) of the Au-decorated fMWCNT. No extra peaks associated with impurities are observed in the spectrums, which proved that the functionalized control crystallinity of Au-decorated fMWCNT materials.

EXAMPLE 5

Raman Spectroscopy

Raman spectroscopy is one of the most powerful tools for characterization of carbon nanotubes. All allotropic forms of carbon are active in Raman spectroscopy, fullerenes, carbon nanotubes, amorphous carbon, polycrystalline carbon, etc. The position, width, and relative intensity of bands are modified according to the carbon forms. This technique provides valuable information about the structure of carbon nanotubes. Briefly, there is strong evidence for a diameter-selective resonant Raman scattering process. The tangential mode (TM) in the range 1400-1700 $cm^{-1}$ gives information on the electronic properties of the tubes, while the analysis of the so called D band at around 1361 $cm^{-1}$ provides information as to the level of disordered carbon. The size of the D band relative to the TM band is a qualitative measure of the formation of undesirable forms of carbon. In this experiment, it is used 788-nm (semiconductor Sapphire Laser) excitation for checking Au-decorated fMWCNT. This is the most direct evidence of Au-decorated fMWCNT, which is directly detected by Raman spectroscopy. The Raman spectrum of the Au-decorated fMWCNT shown in FIG. 2B, where the G-line at 1599 $cm^{-1}$ originates from the graphitic sheets and the peak at 1361 $cm^{-1}$ is related to the defects (disorder mode consistent with sidewall functionalization) in Au-decorated fMWCNT. From this, we can also conclude that the physical structure of the Au-decorated fMWCNT was not changed with the only exception of the opened ends.

EXAMPLE 6

FTIR Spectroscopy

FTIR studies have been performed in the range 400 to 4000/$cm^{-1}$ for the identification of the functional group attached on the surface of the Au-decorated fMWCNT. FTIR spectroscopy has been used extensively in the structural determination of molecules. FIG. 2C shows a comparative FTIR data for the refluxed samples. As observed in the prepared sample there is a signal with small C—C stretch (1598 $cm^{-1}$). By acid treatment quite a number of new peaks appear. The bands due to the C=O stretch are very prominently seen in the range 1712 $cm^{-1}$ for the carboxylated fMWCNT. The sample refluxed in 3:1 $H_2SO_4$:$HNO_3$ acid for 6-7 hrs shows a distinct band at 1710 $cm^{-1}$, which can be assigned to the acid carbonyl-stretching mode (FIG. 2C). Another band exhibit in this functionalized sample is at 3396 $cm^{-1}$ that is characteristic of O—H stretches. The C—C vibrations occur due to the internal defects, and the O—H vibration is associated with the amorphous carbon because amorphous carbon easily forms a bond with atmospheric air. However, the intensity of this O—H peak is relatively lower and shows that a lesser amount of amorphous carbon formed during growth. The peak at 1598 $cm^{-1}$ can be associated with the stretching of the carbon nanotube backbone. So, the evidence for the formation of functional carboxyl group (peak at 1712 cm$^{-1}$) on the Au-decorated fMWCNT is investigated by FTIR spectroscopy.

EXAMPLE 7

BET Analysis

Brunauer-Emmett-Teller (BET) theory aims to explain the physical adsorption of gas molecules (especially nitrogen gas) on a mesoporous functionalized carbon nanotubes and serves as the basis for an analysis method for the measurement of the specific surface area of prepared Au-decorated fMWCNT. The average pore diameter and specific surface area (BET: surface and pore volume] were measured for Au-decorated fMWCNT using a Quantochrome NOVA 1000 (Boynton Beach, Fla., USA). In order to estimate if any change of the physical structure occurs of Au-decorated fMWCNT, the pore size distribution and the specific surface area were investigated using multipoint BET analysis. The pore size is in the range between 1.232 nm to 2.153 nm and the Au-decorated fMWCNT a specific surface area of 222.450 m$^2$/g. Therefore, the observed surface area results from a formation of nanopores accessible for the nitrogen-gas, resulting in an increase of the capacitance of the Au-decorated fMWCNT. The experimental data exhibited that varying the synthetic conditions, extensively affected the pore size distribution and specific surface area of obtained Au-decorated fMWCNT.

EXAMPLE 8

Binding-Energy Analysis

XPS measurements were measured for Au-decorated fMWCNT to investigate the chemical states of carbon and oxygen. XPS was used to determine the chemical state of the Au-decorated fMWCNT and their depth. The spin-orbit peaks of the C1s binding energy for the samples appeared at around 285.1 eV, which is in good agreement with the reference data for carbon. The O1s spectrum shows a distinguished peak at 532.7 eV. The peak at 532.7 eV is assigned to lattice oxygen, which indicated the presence of oxygen (ie, $O_2^-$) in the Au-decorated fMWCNT. The Au 4f spectrum of the Au-decorated fMWCNT exhibits gold nanoparticles to be in a single metallic state with distinguished Au4f$_{7/2}$ and Au4f$_{5/2}$ peaks at 83.9 and 88.2 eV respectively. XPS compositional analyses evaluated the co-existence of the three single-atoms in Au-decorated fMWCNT. Therefore, it is concluded that the functionalized carbon nanotubes composites have tube-phase contained two different elements. Also, this conclusion is reliable with the XRD data significantly in this investigation.

EXAMPLE 9

Structural and Morphological Analysis

Figure 3:
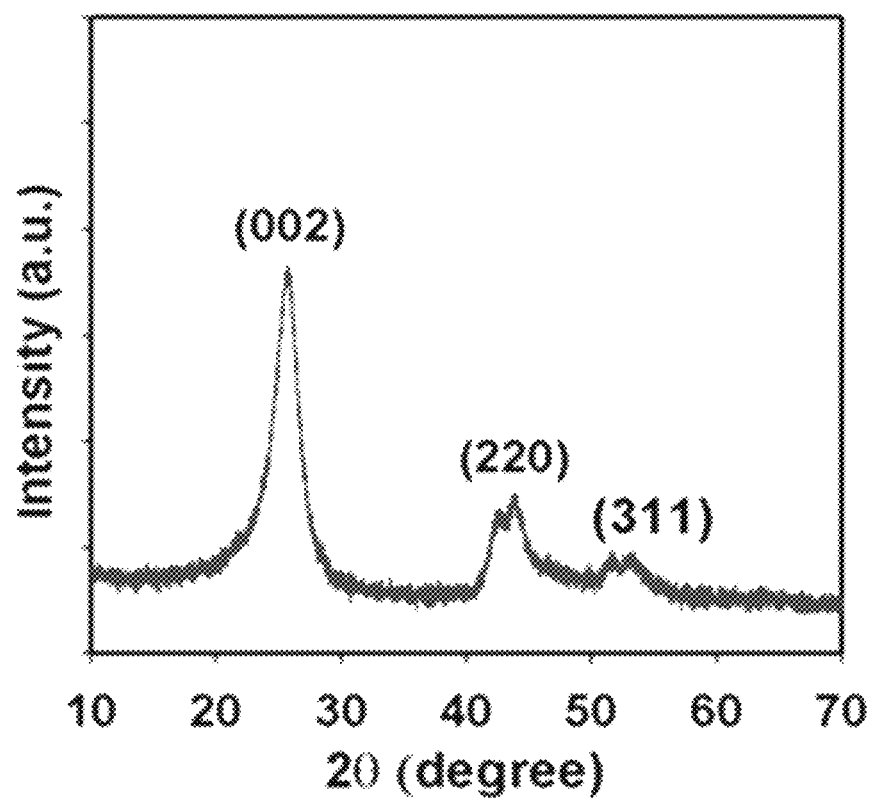
FIG. 3 is an X-ray diffraction spectrum of the gold-coated carbon nanotubes.

As described in the recent works, the significant diffraction pattern of Au-decorated fMWCNT is appeared at 2θ of 26.1° as shown in FIG. 3. The 2θ peaks is corresponded to (002) reflection planes or also known as interlayered spacing between adjacent graphite layers, respectively. The (002) reflection peaks was observed at the same 2θ values in functionalized MWCNTs diffractions. From XRD patterns of the functionalized MWCNTs samples, it is shown that the XRD patterns are similar to the pristine fMWCNTs. From XRD patterns, it can be conclude that functionalized MWCNTs is still had same cylinder-wall structure and inter-planner spacing after the functionalization process. Thus, the structure of Au-decorated fMWCNT is protected even after undergone the treatment as confirmed from XRD analysis previously. The diameter of Au-decorated fMWCNT was also calculated and confirmed using Scherrer formula (Eq. 2):

$$D = 0.9\lambda/(\beta \cos \theta) \quad \text{(Eq. 2)}$$

where λ is the wavelength of x-ray radiation, β is the full width at half maximum (FWHM) of the peaks at the diffracting angle θ. The average diameter of Au-decorated fMWCNT is close to ~11.2 nm.

High resolution FESEM images of Au-decorated fMWCNT are displayed in FIG. 4A and FIG. 4B. The FESEM images of gold-aggregated on functional materials are exhibited in tube-shapes. The average diameter of Au-decorated fMWCNT is calculated in the range of 9.0 to 20.0 nm, which is close to ~11.9 nm.

It is clearly displayed from FESEM that the Au-decorated fMWCNT is exhibited in regular white spotted gold onto tube-shape CNT with high-density materials. Thus, the treatment of fMWCNTs with strong oxidizing agents causes severe etching of the graphitic surface of the material, leading to tubes of shorter length with a large population of disordered sites. Analysis of FESEM images of gold-decorated functionalized MWCNTs allowed reliable length measurements of only a few nanotubes, and all of them were between 9.0 to 20.0 nm, similar to pristine material previously reported. It is also confirmed that the Au-decorated functional nanotubes are composed in Au-white-spot onto tube-shape CNT of aggregated Au-decorated-fMWCNT.

EXAMPLE 10

Elemental Analysis

The X-ray electron dispersive spectroscopy (XEDS) investigation of Au-decorated fMWCNT indicates the presence of C, Au, and O composition in the functional materials. It is clearly displayed that prepared Au-decorated fMWCNT controlled only carbon and oxygen elements. The composition of C, Au, and O is 93.63%, 1.09%, and 5.46% respectively. No other peak related with any impurity has been detected in the XEDS, which confirms that the Au-decorated fMWCNT products are composed only with C, Au, and O elements. Here, after functionalization the final product contains oxygen element in the nanotubes which confirm to the formation of carboxylic group (—COOH) in the carbon nanotubes. It is also confirmed from the existence of Au-element that the functionalized carbon nanotubes is decorated by adsorbed and aggregated Au-atom on the surface or defect area of the nanotubes.

EXAMPLE 11

Detection of Bisphenol-A by Au-Decorated fMWCNT/Microchip Assembly

The potential application of Au-decorated fMWCNT assembled onto microchip as chemical sensors (especially BPA analyte) has been monitored for detecting hazardous chemicals, which are not environmental safe. Improvement of Au-decorated fMWCNT on microchip as chemical sensors is in the initial stage and no other reports are available with Au-decorated fMWCNT-fabricated-chips. The Au-decorated fMWCNT sensors have advantages such as stability in air, non-toxicity, chemical inertness, electrochemical activity, simplicity to assemble or fabrication, and bio-safe characteristics. As in the case of toxic BPA sensors, the phenomenon of reason is that the current response in I-V method of Au-decorated fMWCNT considerably changes when aqueous BPA are adsorbed.

The Au-decorated fMWCNT were applied for modification of chemical sensor, where BPA was measured as target analyte. The magnified construction view of internal microchip center (sensing area) is presented in the FIGS. 1A, 1B, and 1C, wherein platinum line (PtE) and gold-central-circle onto microchip is employed as CE (counter electrode) and WE (working electrode) electrodes (potential sources of two-electrodes assembly system onto the microchips) respectively. In addition, FIG. 1D shows the components of the working electrode. The fabricated-surface of Au-decorated fMWCNTs/microchips sensor was made with conducting binders on the microchip surface, which is presented in the FIG. 1D. The fabricated microchip electrode was placed into the oven at low temperature (60.0° C.) for two hours to make it dry, stable, and uniform the surface totally. I-V signals of chemical sensor are anticipated having Au-decorated fMWCNT thin film as a function of current versus potential for hazardous BPA. The real electrical responses of target BPA are investigated by simple and reliable I-V technique using Au-decorated fMWCNTs/microchips. The time holding of electrometer was set for 1.0 sec. A significant amplification in the current response with applied potential is noticeably confirmed.

In FIG. 5A shows the current responses of un-coated (gray-dotted) and coated (dark-dotted) microchip working electrodes with Au-decorated fMWCNT in absence of target BPA. With Au-decorated fMWCNT fabricating surface, the current signal is slightly reduced compared to uncoated Au-decorated fMWCNTs/microchip surfaces, which indicates the surface is slightly inhibited with Au-decorated fMWCNT during the measurement of I-V curve. The current changes for the without target (dark-dotted) and with target analyte (pink-dotted) injecting of towards target BPA (having a volume of ~25.0 µL and a BPA concentration of ~0.1 µM) onto with Au-decorated fMWCNTs/microchips is showed in FIG. 5B. A significant current enhancement is exhibited with the Au-decorated fMWCNT modified microchips compared with uncoated microchips due to the presence of mesoporous carbon nanotubes, which has higher-specific surface area, larger-surface coverage, excellent absorption and adsorption capability into the porous gold-decorated fMWCNTs surface towards the target BPA. This significant change of surface current is monitored in every injection of the target BPA onto the Au-decorated fMWCNTs modified microchips by electrometer. I-V responses with Au-decorated fMWCNTs modified microchip surface are investigated from the various concentrations (1.0 nM to 1.0 M) of BPA, which is showed in FIG. 5C. It shows the current changes of fabricated Au-decorated fMWCNTs/microchips as a function of BPA concentration in room condition.

Figure 6:
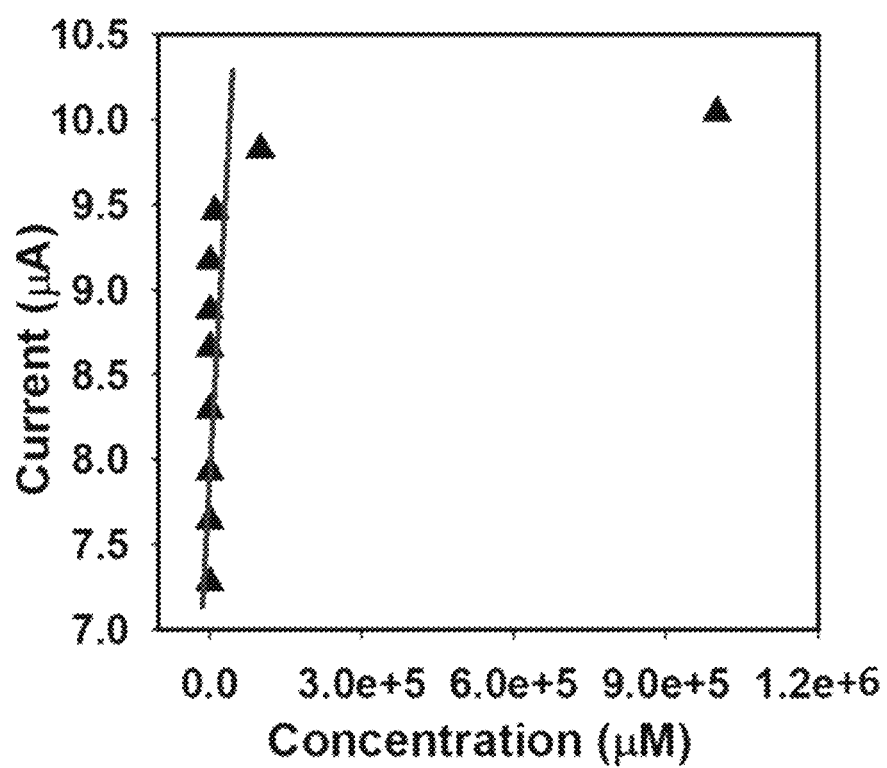
FIG. 6 is a calibration curve of the electrochemical cell.

It was also found that at low to high concentration of target BPA analyte, the current responses were enhanced regularly. The potential current changes at lower to higher potential range (potential, +0.1 V to +1.5 V) based on various BPA analyte concentration are observed, which is clearly presented in FIG. 5C. A large range of analyte concentration is measured the probable analytical limit, which is calculated in 1.0 nM to 1.0 M. The calibration (at +0.5V) and magnified-calibration curves are plotted from the various BPA concentrations, which are presented in the FIG. 6. The sensitivity is estimated from the calibration curve, which is close to ~5.7402 $\mu A \cdot cm^{-2} \cdot mM^{-1}$. The linear dynamic range of this Au-decorated fMWCNTs/microchips sensor displays from 0.1 nM to 10.0 mM (linearity, $r^2$=0.9927) and the detection limit was considered as 0.91±0.02 nM [3×noise (N)/slope(S)].

EXAMPLE 12

Figure 7B:
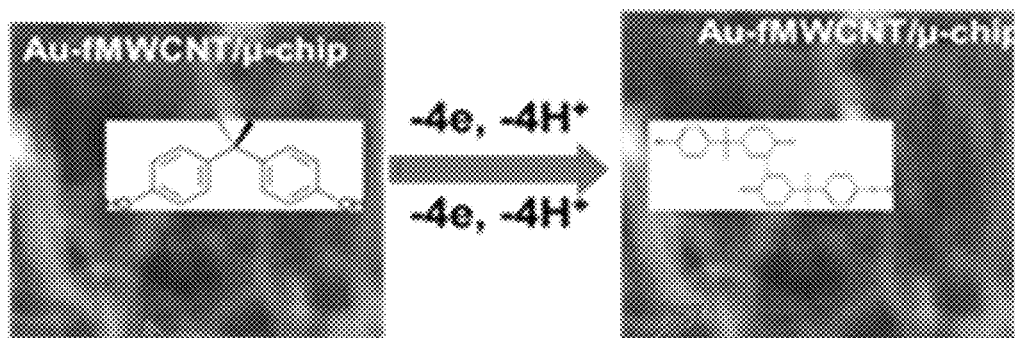
FIG. 7B is a mechanism of oxidation of BPA on the working electrode of the electrochemical cell.
Figure 7A:
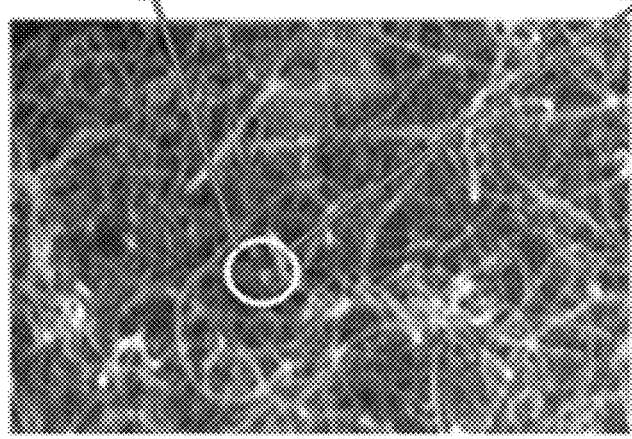
FIG. 7A is an FESEM micrograph of the gold-coated carbon nanotubes.

BPA sensing mechanism on microchip sensor is executed due to the presence of gold decorated functional MWCNTs in phosphate buffer systems. The resistance value of Au-decorated fMWCNTs/microchip is decreased (current increased) with increasing surrounding active oxygen, which are the fundamental characteristics of materials. Actually, dissolved oxygen adsorption demonstrates a significant responsibility in the electrical properties of the Au-decorated fMWCNT coated by conducting binders onto tiny microchip. The mechanism for the oxidation of BPA has been evaluated and presented in FIG. 7B. For BPA, the mechanism was already reported in the literature. The mechanism process of BPA is controlled by the oxidation of BPA on the fabricated or modified electrode surfaces. The initial stage in the oxidation of phenols after 4-electron transfer leads to the formation of quinones. The electro-deposited products of BPA are proposed here to contain several oxidizing centers which are known to contain selective o-quinone or p-quinone via a four electron and four-proton process. The subsequent responses which develop after the first evaluation were ascribed to the I-V responses of the deposited Au-decorated fMWCNT/microchips as observed. Reaction mechanisms of BPA were proposed to contain several oxidizing centers which are known to contain o-quinone or p-quinone via a four electron and four-proton process. These proposed reactions are held in bulk-system interface or adjacent conducting binder coated chips due to the small carrier concentration which enhanced the resistances. The BPA sensitivity could be attributed to the electrocatalysis occurred onto Au-decorated fMWCNTs/microchip and higher density conducts to increase electron transfer. The larger quantity of electron transfer on the fabricated sensor surface produces a larger oxidizing potential and a faster rate of oxidation of BPA. In the reaction system, these reactions referred to oxidation of the BPA carriers in presence of Au-decorated fMWCNTs/microchip systems. Consequently, resistance is reduced, and hence the conductance is increased. This is the cause why the analyte response (current) amplifies with increasing potential from 0 to +1.5V. Thus produced electrons contribute to rapid increase in conductance of the thin Au-decorated fMWCNTs/microchip film.

EXAMPLE 13

The Au-decorated fMWCNTs/microchip unusual regions dispersed on the surface would progress the capability of Au-decorated fMWCNT to absorb more BPA species giving high resistance in ambient air. The sensor response time was ~10.0 sec for the Au-decorated fMWCNT fabricated microchip sensor to achieve saturated steady state current in I-V plots. The major sensitivity of Au-fMWCNTs/microchips sensor can be attributed to the good absorption (porous surfaces CNTs fabricated with binders), adsorption ability, and high-catalytic activity of the Au-decorated fMWCNTs/microchips. The expected sensitivity of the Au-decorated fMWCNTs/microchips fabricated sensor is relatively better than previously reported BPA sensors based on other composites or materials modified electrodes. Due to large and active surface area, here the Au-decorated fMWCNT proposed a beneficial nanoenvironment for the toxic chemical detection (by adsorption) and recognition with excellent quantity using tiny microchips. The prominent sensitivity of Au-decorated fMWCNTs/microchips affords high electron communication features which improved the direct electron communication between the active sites of Au-decorated fMWCNT composed conducting binder coated microchips. The modified thin Au-fMWCNTs/microchips sensor film had a better reliability as well as stability in ambient conditions. Au decorated fMWCNTs/microchips exhibits several approaching in providing BPA chemical based sensors, and encouraging improvement has been accomplished in the research section.

EXAMPLE 14

It was also investigated the sensing selectivity performances (interferences) with other chemicals like methanol, 3-methoxy phenol, BPA, ethanol, bromide, 4-aminophenol, and 1,2 dichlorobenzene etc. (FIG. 8A). BPA exhibited the maximum current response by I-V system using Au-decorated fMWCNT fabricated microchip electrodes. BPA exhibited the maximum current response by I-V system using Au-decorated fMWCNTs/microchips compared to others chemical, which is presented in FIG. 8B. By deducting the current value of blank solution (at +0.5V), it is found the current value is less than 5% for all chemicals (3-methoxyphenol 1.5%, ethanol 2.1%, 4-aminophenol 4.0%, methanol 4.7%, 1,2 dichlorobenzene 4.8%, bromide 3.8%, and blank (PBS only, 0%)), compared to target BPA (90.1%). It is specific towards BPA chemical compared to all other chemicals towards Au-decorated fMWCNTs/microchips sensor in phosphate buffer system.

EXAMPLE 15

To investigate the reproducibly and storage stabilities, I-V response for Au-fMWCNTs/microchips sensor was examined (up to 2 weeks). After each experiment, the fabricated Au-fMWCNTs/microchips substrate was washed gently and observed that the current response was not significantly decreased (FIG. 8C). A series of five successive measurements of 0.1 μM BPA in solution yielded a good reproducible signal at Au-fMWCNTs/microchips sensor in different conditions with a relative standard deviation (RSD) of 1.8% (FIG. 8C).

The sensitivity was retained almost same of initial sensitivity up to week ($1^{st}$ to $2^{nd}$ week), after that the response of the fabricated Au-fMWCNTs/microchips gradually decreased. The sensor-to-sensor and run-to-run repeatability for 0.1 μM BPA detection were found to be 1.2% using Au-fMWCNTs/microchips. To investigate the long-term storage stabilities, the response for the Au-fMWCNTs/microchips sensor was determined with the respect to the storing time. The long-term storing stability of the Au-fMWCNTs/microchips sensor was investigated significantly at room conditions. The sensitivity retained 95% of initial sensitivity for several days. The above results clearly suggested that the fabricated sensor can be used for several weeks without any significant loss in sensitivity. The dynamic response (1.0 nM to 10.0 mM) of the sensor was investigated from the practical concentration variation curve. The sensor response time is mentioned and investigated using this sensor system at room conditions. In Table 1, it is compared the performances for BPA chemical detection based on various modifications with different materials. It exhibits the higher sensitivity using Au-decorated fMWCNTs/microchips compared other materials fabricated sensors with the similar target analytes.

TABLE 1

| Electrode fabrication | Technique/ Methods | Linear Dynamic Range (LDR) | Sensitivity (μA μM $cm^{-2}$) | Limit of Detection (LOD) | pH |
|---|---|---|---|---|---|
| Chitosan-rapheme/ABPE | Voltammetry | 8.0 nM to 1.0M | — | 6.0 nM | — |
| SWNTs/β-cyclodextrin-GCE | Amperometry | 1.0 nM-1.85 μM | — | 1.0 nM | — |
| MWCNT/melamine/GCE | CV | 10.0 nM to 40.8 μM | — | 5.0 nM | — |
| Thionine/CPE | Amperometry | 0.15 μM-45.0 μM | — | 0.15 μM | — |
| Silica MCM-41/CPE | DPV | 0.22 μM-8.8 μM | — | 0.038 μM | — |
| Au/Agcore-shell NPs | Raman Spetroscopy | 00 nM to 10 fM | — | 10.0 fM | — |
| Magnetic NPs/CPE | CV | 6.0 μM-100 μM | — | 0.1 μM | — |
| Poly(2-aminothiophenol)/GCE | CV | 0.6 μM-55.0 μM | — | 0.2 μM | — |
| β-Cyclodextrin/CPE | DPV | 0.1 μM-11.0 μM | — | 0.83 μM | — |
| 1,10-PhenanNTf$_2$ ionic liquid/AgE | I-V | 0.1 nM-0.1 mM | 1.485 | 0.09 ± 0.01 nM | 7.1 |
| Au-fMWCNT/microchips | I-V | 1.0 nM-10.0 mM | ~5.7402 | 0.91 nM | 7.1 |

EXAMPLE 16

Advantages of the Chemical Sensor

This methods and detectors described herein provide an economic route to simple, reliable, and cost effective electrochemical BPA chemical sensors having AuNPs-decorated fMWCNTs/microchips by I-V method at room conditions. It is accentuated that the above described embodiments of the present disclosure, described with the help of examples, are generally describing the disclosure. Many modifications and variations may be made to the above described embodiment of the invention without deviating from the fundamental nature and scope of the invention.

This chemical sensor based on AuNPs-decorated fMWCNTs/microchips by I-V method can detect BPA chemicals with I-V approaches. It is cheap, easy to handle, simple to prepare, and more effective sensor with AuNPs-decorated fMWCNTs/microchips.

The invention claimed is:

1. An electrochemical cell assembly, comprising:
an electrochemical cell comprising
a working electrode, comprising a gold-titanium alloy with a gold content of 70-90 wt %, based on a total weight of the working electrode;
gold-coated carbon nanotubes comprising:
carboxylic acid functionalized carbon nanotubes, and
gold nanoparticles bound to the carboxylic acid functionalized carbon nanotubes,
wherein a diameter of each of the gold-coated carbon nanotubes is within a range of 5-20 nm, and
wherein the gold-coated carbon nanotubes are in the form of a buckypaper with a thickness in the range of 100 to 500 µm;
a conductive epoxy binder in the form of a cured layer with a thickness of 1-3 mm, which is sandwiched between the gold-coated carbon nanotubes and the working electrode, that binds the gold-coated carbon nanotubes to the working electrode;
a microchip strip on which the electrochemical cell is disposed; and
a counter electrode disposed adjacent to the working electrode having a gap therebetween.

2. The electrochemical cell assembly of claim 1, wherein the counter electrode comprises at least one metal selected from the group consisting of platinum, silver, copper, and zinc.

3. The electrochemical cell assembly of claim 1, wherein the carbon nanotubes are multi-walled carbon nanotubes.

4. The electrochemical cell assembly of claim 1, wherein the gold-coated carbon nanotubes have a specific surface area in the range of 50-500 $m^2/g$.

5. The electrochemical cell assembly of claim 1, wherein the buckypaper has pores in the size range of 0.5-5 nm.

6. The electrochemical cell assembly of claim 1, wherein the working electrode is circular having a diameter in the range of 1-10 mm, and wherein the counter electrode is disposed circumferentially around the working electrode having a gap therebetween.

* * * * *